(12) United States Patent
Rankich et al.

(10) Patent No.: US 8,052,063 B2
(45) Date of Patent: Nov. 8, 2011

(54) AIR CONDITIONING SYSTEM, CONTROL UNIT AND OTHER COMPONENTS USED THEREWITH

(75) Inventors: Stephen Rankich, Fontana, CA (US); John Iest, Mission Viejo, CA (US)

(73) Assignee: Stephen Rankich, Fontana, CA (US)

( * ) Notice: Subject to any disclaimer, the term of this patent is extended or adjusted under 35 U.S.C. 154(b) by 451 days.

(21) Appl. No.: 12/170,010

(22) Filed: Jul. 9, 2008

(65) Prior Publication Data

US 2009/0101726 A1 Apr. 23, 2009

Related U.S. Application Data

(60) Provisional application No. 60/948,592, filed on Jul. 9, 2007.

(51) Int. Cl.
*G05D 23/00* (2006.01)
*G08B 1/08* (2006.01)
*G01M 1/38* (2006.01)

(52) U.S. Cl. ...................... 236/51; 340/539.14; 700/276

(58) Field of Classification Search ..................... 236/51, 236/1 C; 62/498, 259.1; 700/276, 277; 375/295, 375/316; 340/539.1, 539.14
See application file for complete search history.

(56) References Cited

U.S. PATENT DOCUMENTS 7,296,426 B2 * 11/2007 Butler et al. .................... 62/181
* cited by examiner

*Primary Examiner* — Chen Wen Jiang
(74) *Attorney, Agent, or Firm* — John J. Connors; Connor & Assoc. pc

(57) ABSTRACT

An air-conditioning system operable at different states employs a control unit including a receiver and a transmitter. The receiver is connected electrically to a switching device for a compressor of the air-conditioning system. The compressor is installed at a remote location exterior to a building. The receiver is responsive to an encoded radio signal to provide an electronic control signal for actuating the switching device. The transmitter is installed within the building and is electrically connected to a thermostat within the building that responds to temperature changes to provide a temperature control signal. The transmitter upon receipt of the temperature control signal transmits to the remote location the encoded radio signal for operating the air-conditioning system at one of the different states.

9 Claims, 23 Drawing Sheets

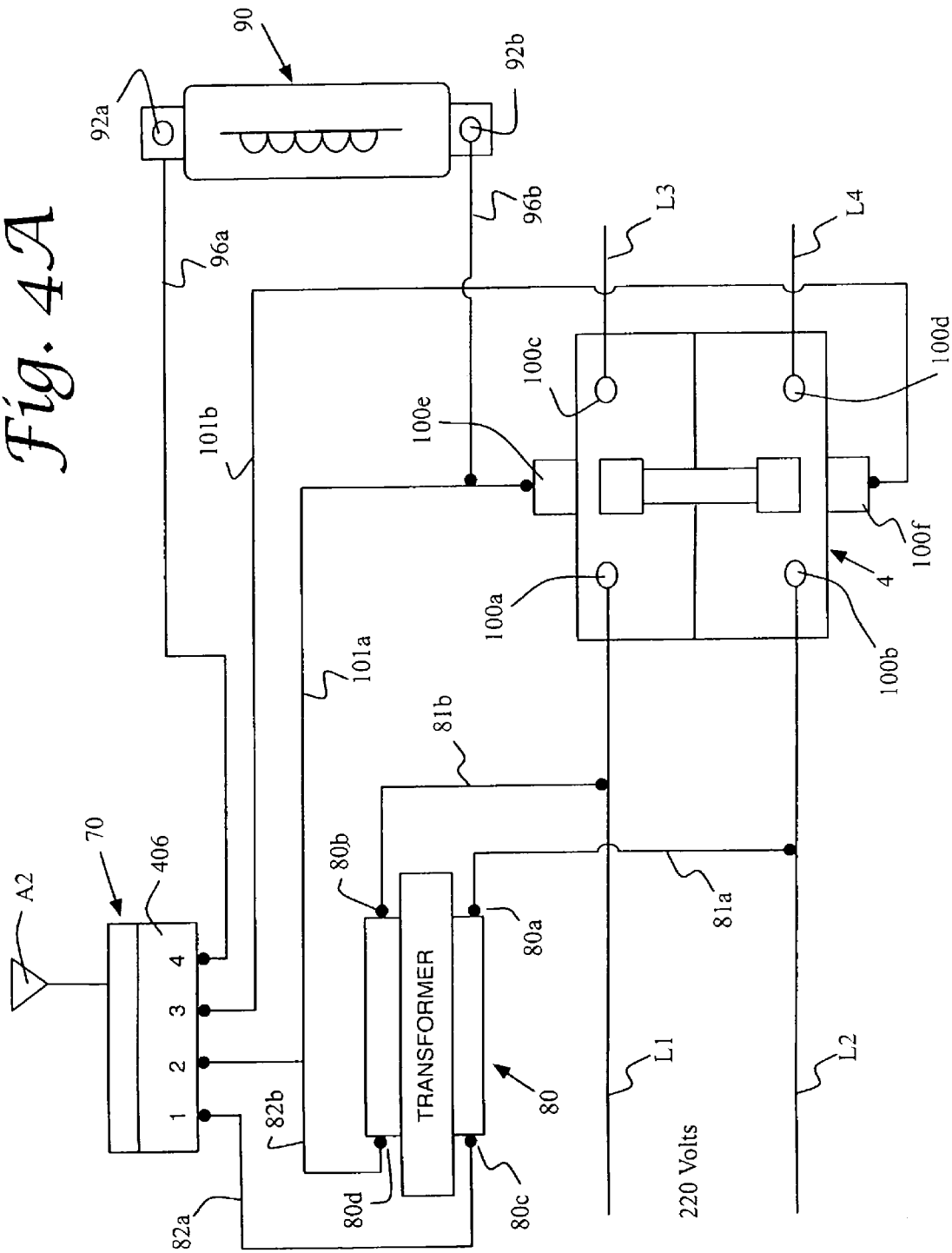

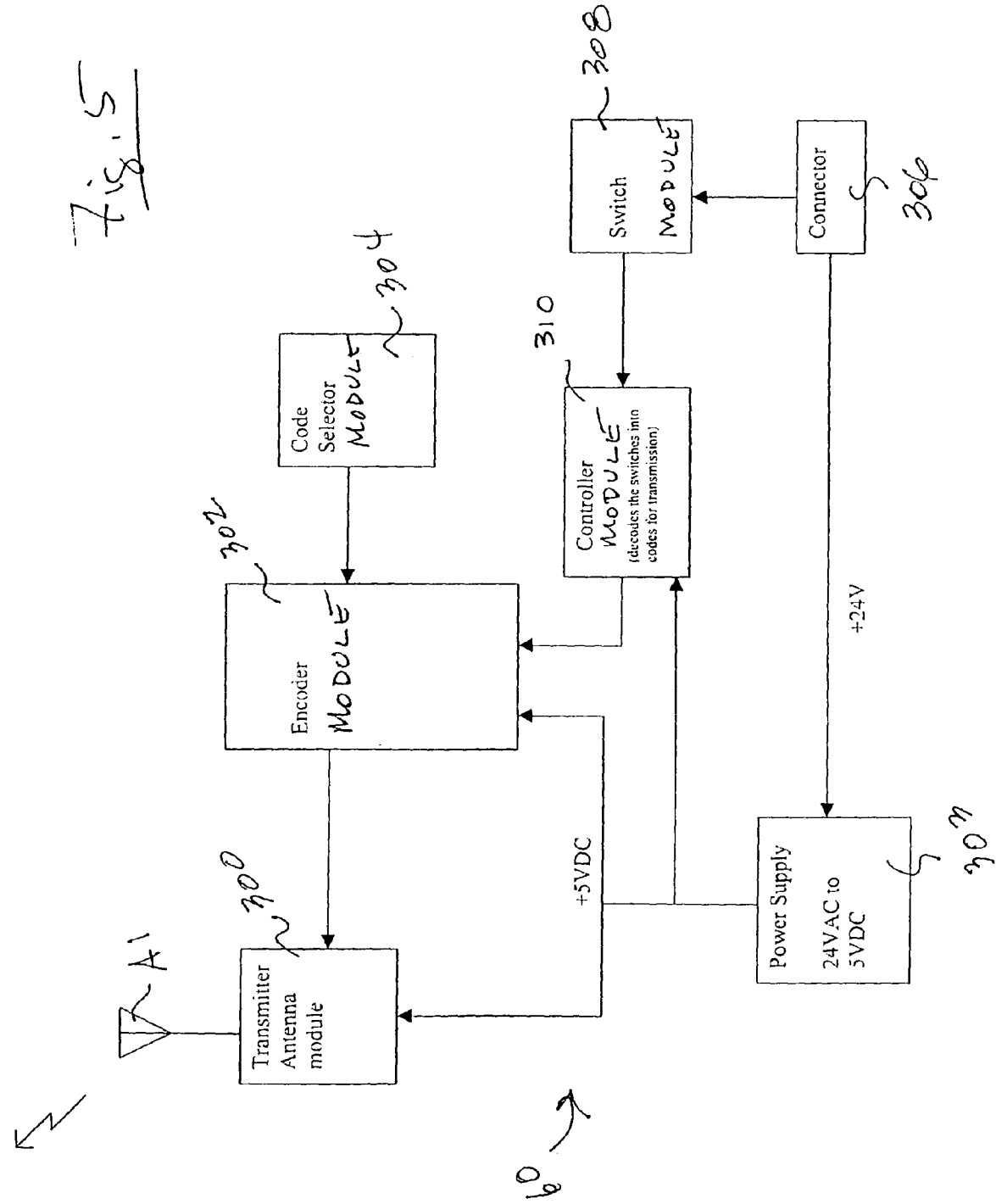

Fig. 5B    Remote Air Conditioner Transmitter Board Assembly

TABLE I

| Item | Qty | P/N | Title | Detail | Reference(m) | Vendor P/N | Vendor | Mfr P/N |
|---|---|---|---|---|---|---|---|---|
| 1 | 3 | 200-001 | Cap, AE, Radial | 100uF, 25V, 20%, LS. 1" | C1, 5, 8 | P5152-ND | Digi-Key | ECE-A1EU101 |
| 2 | 1 | 201-019 | Cap, CD, RADIAL | 1000pF, 100V, 5%, .2" ls | C6 | 80-C317C102J1G | Mouser Electronics | C317C102J1G5CA |
| 3 | 2 | 202-014 | Cap, MLC, .1" lead spacing | 1uf, 50V, +/- 15% | C3, C7 | 80-C320C104K5R | Mouser Electronics | C320C104K5R5CA |
| 4 | 2 | 206-031 | Cap, Tant | 10uF, 10V, 10% | C2, C4 | P2026-ND | Digi-Key | ECS-F1AE106K |
| 5 | 1 | 220-002 | Res, CF | 10K, 1/4W, 5% | R2 | 10KQBK-ND | Digi-Key | CFR-25JB-10K |
| 6 | 2 | 220-003 | Res, CF | 1.0K, 1/4W, 5% | R4, R6 | 1.0KQBK-ND | Digi-Key | CFR-25JB-1K0 |
| 7 | 1 | 220-006 | Res, CF | 330, 1/4W, 5% | R5 | 330QBK-ND | Digi-Key | CFR-25JB-330R |
| 8 | 1 | 220-073 | Res, CF | 20K, 1/4W, 5% | R1 | 20KQBK-ND | Digi-Key | CFR-25JB-20K |
| 9 | 1 | 220-123 | Res, CF | 10, 1/4W, 5%, RoHS | R3 | 291-10 | Mouser Electronics | 291-10 |
| 10 | 1 | 251-004 | RF Module, Transmitter | 433.92 Mhz | U4 | TXM315LC | Linx Techologies | |
| 11 | 2 | 285-045 | Relay, DC | RELAY REED DIP SPST-NO 24V | K1, K2 | | | |
| 12 | 5 | 300-018-2 | Conn, Dual strip Hdr, Breakaway, 300-018 | 2 Pin Dual Row, strip, .1" | W1-W5 | | Amest Corp | |
| 13 | 1 | 300-022 | Conn, Hdr, Brkway | 24 Pin, .156" Brkway,Straight Friction Lock | J1 | 26-48-1245 | Avnet Kent Electronics | 26-48-1245 |
| 14 | 1 | 400-012 | Diode, Zener, 1N4749 | 24V, 1W | D3 | 1N4749 | All American | |
| 15 | 1 | 400-026 | Diode, Bridge, DB101 | 1.0A, 50V, Dip | D1 | DB101MS-ND | Digi-Key | DB101 |
| 16 | 2 | 400-043 | Diode, Rectifier, 1N4002 | 1A, 100V, DO-41 | D2, D4 | 09F3580 | Newark Electronics | 1N4002 |
| 17 | 1 | 450-197 | IC, Digital, MC145027P | DECODER 5 ADDR 4 DATA 16-DIP | U5 | MC145027P-ND | Digi-Key | MC145027P |
| 18 | 1 | 485-006 | IC, Microcontroller, PIC12C671 | 8 A/D bit, 8 pin DIP | U2 | PIC12C671-04/P | Future Active Electronics | |
| 19 | 1 | 504-011 | IC, Volt Reg, LM78L05 | +5V, 100 ma, 5%, TO-92 | U3 | LM78L05ACZNS-ND | Digi-Key | LM78L05ACZ |

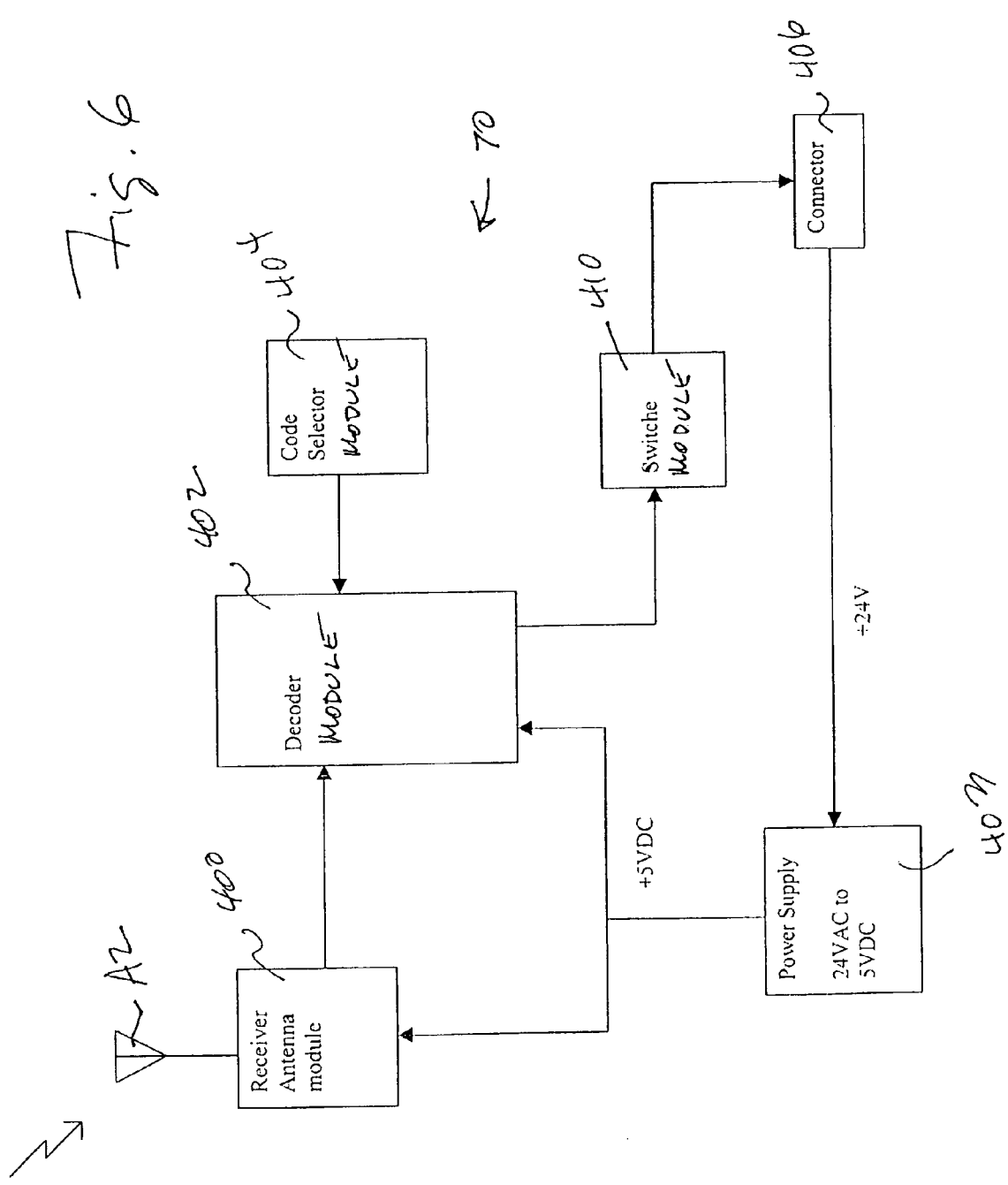

TABLE II Fig. 6B

Remote Air Conditioner Receiver Board Assembly

| Qty | P/N | Title | Detail | Reference(m) | Vendor P/N | Vendor | Mfr P/N |
|---|---|---|---|---|---|---|---|
| 1 | 200-001 | Cap, AE, Radial | 100uF, 25V, 20%, LS.1" | C1 | P5152-ND | Digi-Key | ECE-A1EU101 |
| 2 | 202-014 | Cap, MLC, .1" lead spacing | .1uf, 50V, +/- 15% | C3, C5 | 80-C320C104K5R | Mouser Electronics | C320C104K5R5CA |
| 1 | 202-029 | Cap, MLC, radial | .01uF, 50V, 10%, .1" ls | C4 | 80-C315C103K5R | Mouser Electronics | C315C103K5R5CA |
| 2 | 206-031 | Cap, Tant | 10uF, 10V, 10% | C2, C6 | P2026-ND | Digi-Key | ECS-F1AE106K |
| 1 | 220-006 | Res, CF | 330, 1/4W, 5% | R5 | 330QBK-ND | Digi-Key | CFR-25JB-330R |
| 2 | 220-020 | Res, CF | 4.7K, 1/4W, 5% | R3, 8 | 4.7KQBK-ND | Digi-Key | CFR-25JB-4K7 |
| 1 | 220-103 | Res, CF | 39K, 1/4W, 5%, RoHS | R1 | 39KQBK-ND | Digi-Key | CFR-25JB-39K |
| 1 | 220-116 | Res, CF | 75K, 1/4W, 5%, RoHS | R2 | 75KQBK-ND | Digi-Key | CFR-25JB-75K |
| 2 | 220-123 | Res, CF | 10, 1/4W, 5%, RoHS | R4, 10 | 291-10 | Mouser Electronics | 291-10 |
| 2 | 220-167 | Res, CF | 470, 1/4W, 5% | R6, 7 | 470QBK-ND | Digi-Key | CFR-25JB-470R |
| 1 | 251-005 | RF Module, Receiver | 433.92 Mhz | U1 | RXM315LP | Linx Techologies | |
| 2 | 285-046 | Relay, DC | RELAY REED DIP SPST-NO 5V | K1, K2 | | | |
| 5 | 300-018-2 | Conn, Dual strip Hdr. Breakaway, 300-018 | 2 Pin Dual Row, stmp,.1" | W1-W5 | | Amest Corp | |
| 1 | 300-022 | Conn, Hdr, Brkway | 24 Pin, .156 " Brkway,Straight Friction Lock | J1 | 26-48-1245 | Avnet Kent Electronics | 26-48-1245 |
| | 400-012 | Diode, Zener, 1N4749 | 24V, 1W | D2 | 1N4749 | All American | |
| 1 | 400-026 | Diode, Bridge, DB101 | 1.0A, 50V, Dip | D1 | DB101MS-ND | Digi-Key | DB101 |
| 1 | 401-004 | LED, Red | Red, diffused, T-1 3/4 | D3 | HLMP-4700QT-ND | Digi-Key | HLMP4700 |
| 1 | 401-021 | LED, Green | Green, diffused, T-1 3/4 | D4 | 604-L53SGD | Mouser Electronics | L53SGD |
| 2 | 420-007 | Transistor, 2N3904 | NPN, SS | Q1, Q2 | 2N3904FS-ND | Digi-Key | 2N3904 |
| 1 | 450-196 | IC, Digital, MC145026P | ENCODER 9 LINE SIMPLEX 16-DIP | U2 | MC145026P-ND | Digi-Key | MC145026P |
| 1 | 504-011 | IC, Volt Reg, LM78L05 | +5V, 100 ma, 5%, TO-92 | U3 | LM78L05ACZNS-ND | Digi-Key | LM78L05ACZ |

Fig. 8  TABLE III

| Item | Qty | P/N | Title | Reference(m) | Detail | Vendor | Mfr | Mfr P/N | Cur/Assy/MF | Cur/Assy/MFC |
|---|---|---|---|---|---|---|---|---|---|---|
| 42 | 1 | 130-0178 -01 REV A | Remote A/C Transmitter/Receiver | | PCB | Advanced Circuits | | | $44.36 | $44.360 |
| 1 | 3 | 200-013 | Cap, AE, Radial | C18, 19, 20 | 100uF, 50V, 20%, LS 3.5mm | Mouser Electronics | Nichicon | UVZ1H101 MPD | $0.45 | $0.150 |
| 2 | 1 | 206-014 | Cap, Tant, SMD, Size B | C21 | 10uF 10v, 20% | Mouser Electronics | Kemet Electronics | T491B106 M010AT | $0.20 | $0.200 |
| 3 | 1 | 206-082 | Cap, Tant, SMD | C30 | 10uF, 25V, EIA size C | Mouser Electronics | AVX | TAJC106K 025R | $0.85 | $0.850 |
| 4 | 1 | 210-022 | Cap, Ceramic, SMD, 0805 | C29 | 1uF, 16V, 10%, X7R | Digi-Key | Murata | GRM21BR 71C105KA 01L | $0.25 | $0.252 |
| 5 | 1 | 213-003 | Cap, SMD, 0402 | C11 | 5.6pF, ±0.25pF, 50V COG, NP0 | Digi-Key | Murata | GRM1555 C1H5R6D Z01D | $0.03 | $0.034 |
| 6 | 2 | 213-004 | Cap, SMD, 0402 | C4, 7 | 3.9pF, ±0.5pF, 50V COG, NP0 | Digi-Key | Murata | GRM1555 C1H3R9C Z01D | $0.07 | $0.034 |
| 7 | 1 | 213-005 | Cap, SMD, 0402 | C12 | 8.2pF, ±0.5pF, 50V COG, NP0 | Mouser Electronics | Murata | GRM1555 C1H8R2D Z01D | $0.05 | $0.050 |
| 8 | 5 | 213-006 | Cap, SMD, 0402 | C8, 9, 26, 27, 28 | 220pF, ±5%, 50V COG, NP0 | Digi-Key | Murata | GRM1555 C1H221JA 01D | $0.19 | $0.037 |
| 9 | 8 | 213-007 | Cap, SMD, 0402 | C1, 2, 10, 15, 16, 17, 22, 23 | 0.1uF, +/-10%, 10V X5R | Digi-Key | Murata | GRM155R 61A104KA 01D | $0.24 | $0.030 |
| 10 | 2 | 213-008 | Cap, SMD, 0402 | C24, 25 | 0.01uF, +/-5%, 25V X7R | Digi-Key | Kemet | C0402C10 3J3RACT U | $0.07 | $0.033 |

Fig. 8 cont, 2

| Item | Qty | P/N | Title | Reference(m) | Detail | Vendor | Mfr | Mfr P/N | Cur/Assy/MF | Cur/Assy/MFC |
|---|---|---|---|---|---|---|---|---|---|---|
| 11 | 2 | 213-009 | Cap, SMD, 0402 | C5, 6 | 15pF, +/-5%, 50V NP0 | Digi-Key | Murata | GRM1555C1H150JZ01D | $0.04 | $0.020 |
| 12 | 2 | 213-010 | Cap, SMD, 0402 | C13, 14 | 18pF, +/-5%, 50V NP0 | Digi-Key | Murata | GRM1555C1H180JZ01D | $0.00 | $0.000 |
| 13 | 1 | 224-059 | Res, Array, 9 Bussed resistors | R3 | 10K, SIP, SMD, 9 Pin Network,Bussed | Digi-Key | CTS | 752091103 GPB | $2.35 | $2.352 |
| 14 | 3 | 233-002 | Res, SMD, 0402 | R1, 4, 5 | 1.00K, 1/16W, 1% | Digi-Key | Vishay/Dale | CRCW040 21K00FKED | $0.11 | $0.035 |
| 15 | 3 | 233-003 | Res, SMD, 0402 | R11, 16, 17 | 10K, 1/16W, 1% | Digi-Key | Vishay/Dale | CRCW040 210K0FKED | $0.25 | $0.083 |
| 16 | 5 | 233-004 | Res, SMD, 0402 | R7, 8, 9, 12, 13 | 470, 1/16W, 1% | Digi-Key | Vishay/Dale | CRCW040 2470RFKED | $0.20 | $0.040 |
| 17 | 1 | 233-005 | Res, SMD, 0402 | R10 | 0, 1/16W, 1% | Digi-Key | Rohm | MCR01MZ PJ000 | $0.07 | $0.074 |
| 18 | 1 | 233-008 | Res, SMD, 0402 | R2 | 56K, 1/16W, 1% | Mouser Electronics | KOA/Speer Electronics | RK73H1E TTP5602F | $0.02 | $0.020 |
| 19 | 2 | 233-009 | Res, SMD, 0402 | R14, 15 | 4.7K, 1/16W, 1% | Digi-Key | Vishay/Dale | CRCW040 24K70FKED | $0.05 | $0.026 |
| 20 | 3 | 250-025 | Inductor, SMD | L1, 2, 4 | Inductor, 27nH, 300MA, 0402 | Digi-Key | Murata | LQG15HS 27NJ02D | $0.27 | $0.090 |
| 21 | 1 | 250-026 | Inductor, SMD | L3 | Inductor, 22nH, 300MA, 0402 | Digi-Key | Murata | LQG15HS 22NJ02D | $0.09 | $0.090 |
| 22 | 1 | 250-027 | Inductor, Ferrite, SMD | FB1 | Ferrite, Bead, 1000 OHM, 200ma, 0402 | Digi-Key | Murata | BLM15AG 102SN1D | $0.07 | $0.066 |
| 23 | 1 | 251-006 | RF Module, CC1101 | U2 | Transmitter, Receiver, 20 QFN | Digi-Key | Texas Instruments | CC1101RT KR | $4.16 | $4.160 |

Fig. 8 cont. 3

| Item | Qty | P/N | Title | Reference(m) | Detail | Vendor | Mfr | Mfr P/N | Cur/Assy/MF | Cur/Assy/MFC |
|---|---|---|---|---|---|---|---|---|---|---|
| 24 | 1 | 275-056 | Crystal, CSM-7X, SMD | Y1 | 4.0 MHz, 20pf | Digi-Key | ECS Inc | ECS-40-20-5PX-TR | $0.61 | $0.608 |
| 25 | 1 | 275-058 | Crystal, CSM-7, SMD | Y2 | 26.4513 MHz, 12.0pf | Digi-Key | ECS Inc | ECS-264.5 13-CDX-03 81 | $1.95 | $1.950 |
| 26 | 1 | 280-051 | Switch, DIP, SMD | SW1 | 8 position, sealed, gull wing pins | Digi-Key | CTS | 219-8MST | $0.79 | $0.788 |
| 27 | 1 | 280-067 | Switch, Slide, RT angle | SW2 | 4PDT, 200mA 30VDC | Digi-Key | E-Switch | EG4208 | $1.62 | $1.620 |
| 28 | 2 | 285-045 | Relay, DC | K1, 2 | RELAY REED DIP SPST-NO 24V | Digi-Key | Hamlin | HE721A24 00 | $0.00 | $0.000 |
| 29 | 2 | 285-061 | Relay, DC | K3, K4 | 3VDC, 1A, PCB | Digi-Key | Panasonic | TXS2-3V | $7.30 | $3.650 |
| 30 | 1 | 300-285 | Conn, Dual Row, 2mm | J1 | 6 pin male, Dual Row vert | Force Electronics | Hirose | DF11-6DP -2DSA(24) | $0.25 | $0.250 |
| 31 | 1 | 300-348 | Conn, Terminal Block | J3 | 4POS 5MM PCB | Digi-Key | Phoenix Contact | 1729034 | $1.46 | $1.460 |
| 32 | 1 | 300-809 | Conn, Antenna, SMA | J2 | SMA, Right Angle, Surface Mount | Digi-Key | Emerson | 142-0711- 201 | $5.38 | $5.380 |
| 33 | 1 | 400-026 | Diode, Bridge, DB101 | D4 | 1.0A, 50V, Dip | Mouser Electronics | Micro Commerci al Componen ts | DB101-BP | $0.32 | $0.320 |
| 34 | 2 | 400-035 | Diode, Power, MA738 | D2, 3, 11, 12 | 1.5 amp, 40v, SMD | Digi-Key | Panasonic | MA2Q738 00L | $0.81 | $0.406 |
| 35 | 1 | 400-061 | Diode, Schottky, BAT54-7, SOT-23 | D1 | Single diode, 200ma, 30V | Digi-Key | Fairchild | BAT54 | $0.11 | $0.108 |
| 36 | 3 | 401-026 | LED, Green | D7, 9, 14 | Green, diffused, T1 | Digi-Key | Lumex | SSL-LX30 44GD | $0.33 | $0.110 |
| 37 | 1 | 401-027 | LED, Yellow | D10 | Yellow, diffused, T1 | Digi-Key | Lumex | SSL-LX30 44YD | $0.12 | $0.118 |
| 38 | 2 | 401-070 | LED, Red, T1 | D8, 13 | Red, diffused | Mouser Electronics | Kingbright | WP7104H D | $0.06 | $0.032 |

Fig. 8 cont. 4

| Item | Qty | P/N | Title | Reference(m) | Detail | Vendor | Mfr | Mfr P/N | Cur/Assy/MF | Cur/Assy/MFC |
|---|---|---|---|---|---|---|---|---|---|---|
| 39 | 2 | 420-011 | Transistor, MMBT3904, SMD | Q1, 2 | NPN, SOT23 | Future Active Electronics | Fairchild | MMBT3904K | $0.02 | $0.011 |
| 40 | 1 | 485-033 | IC, Microcontroller, Flash, PIC18LF2420 | U1 | Flash, 28 SOIC, Wide voltage range | Digi-Key | Microchip | PIC18LF2420-I/SO | $6.55 | $6.550 |
| 41 | 1 | 504-048 | IC, Volt Reg, LM1086CS-3.3 | U3 | 3.3 v, POSITIVE 1.5A LDO TO-263 | Digi-Key | National Semiconductor | LM1086CS-3.3 | $1.06 | $1.056 |

Thermostat Controller

AIR CONDITIONING SYSTEM, CONTROL UNIT AND OTHER COMPONENTS USED THEREWITH

RELATED PATENT APPLICATIONS & INCORPORATION BY REFERENCE

This utility application claims the benefit under 35 USC 119(e) of U.S. Provisional Patent Application No. 60/948,592, entitled "AIR CONDITIONING SYSTEM, CONTROL UNIT & OTHER COMPONENTS USED THEREWITH," filed Jul. 9, 2007. This related application is incorporated herein by reference and made a part of this application. If any conflict arises between the disclosure of our invention in this utility application and that in the related provisional application, the disclosure in this utility application shall govern. Moreover, any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The words "transmitter" and "receiver" are each intended to include a transceiver, an electronic device that functions both to transmit and to receive a radio frequency signal.

BACKGROUND

Air conditioning systems for buildings comprise a thermostat that communicates temperature information to a master controller that uses this information to energize and de-energize an appropriate climate control unit, such as an air-heating unit or an air-cooling unit. Typically, the thermostat, air-heating unit, and master controller are inside the building and the air-cooling unit is outside the building. Signals between the air-cooling unit and the master controller are transmitted through wires that run from the master controller, through walls of the building, and outside to the air-cooling unit. This necessitates planning and coordinating of where and how the wire will be run when a new building is constructed, or when the air conditioning system is initially installed in an existing building. Moreover, these wires are susceptible to breaks, cracks, corrosion, or attack from various critters that may be living in the walls, such as for example, mice and rats. Once a wire has been severed, replacing it can be a very difficult and expensive process because the wire or wires are often not easily accessible, thus making it very difficult to determine the exact location of the severed part of a wire, often requiring replacing the entire length of wire.

SUMMARY

Our air conditioning system for a building removes the need to run wires from the master controller to the air-cooling unit, facilitating quick and simple repair of severed wires and simplifying installing new air conditioning systems. Our air conditioning system includes the conventional components: An evaporator within the building and a compressor at a remote location exterior to the building that is under the control of a switching device. The compressor may be single stage or two-stage. In the case of a two-stage compressor, a pair of switching devices may be employed. The compressor is connected to the evaporator by a line that extends into the building and through which a refrigerant is cycled between the compressor and the evaporator. A directional flow control valve in the line to the compressor may be used so the system functions as a heat pump. A thermostat within the building responds to temperature changes to provide a temperature control or command signal.

our air conditioning system has one or more of the features depicted in the embodiments discussed in the section entitled "DETAILED DESCRIPTION OF ONE SOME ILLUSTRATIVE EMBODIMENTS." The claims that follow define our air conditioning system, control unit and other components used therewith, distinguishing them from the prior art; however, without limiting the scope of our air conditioning system, control unit and other components used therewith as expressed by these claims, in general terms, one or more, but not necessarily all, of their features are:

One, our system uses unique control units. In one embodiment, two different control units are used. A first control unit has an especially designed transmitter device and a second control unit uses an especially designed receiver device at or nearby the compressor. The first control unit includes a transmitter within the building that is electrically connected to the thermostat and in response to the temperature control signal transmits a radio frequency (RF) control signal to a receiver in the second control unit. The receiver responds to the RF control signal to control the operation of the compressor, including in one embodiment the direction of the flow of refrigerant through the compressor. The RF control signal is at a predetermined frequency to provide an electronic command or control signal that may be coded. A transformer steps down power line voltage to provide to the receiver and transmitter devices a DC voltage lower than power line AC voltage.

Two, the receiver and transmitter devices may include multiple terminals. The transmitter device terminals correspond to the number of terminals of the receiver device. The multiple terminals employed enable connection to a transformer and the switching device for the single compressor or a pair of switching devices for the two-stage compressor or a switching device for the electronically actuated directional flow control valve. The transmitter and receiver devices are compact circuit boards that are easy and quick to install and connect to the conventional elements of our air conditioning system.

Three, our transmitter device may include an antenna module, an encoding module, a connector, a switch module, and a controller module. The antenna module transmits the radio frequency control signal, and the encoding module operably connected to the antenna module generates a first digitally encoded message applied to the radio frequency signal for operating our air-conditioning system at a first state and a second digitally encoded message applied to the radio frequency signal for operating the air-conditioning system at a second state. The connector includes a plurality of terminals, each configured to be connected individually to one of a plurality of terminals of a master controller. The switch module operably connected to the connector includes a first switching device actuated when one of the connector terminals receives a first control signal from the master controller to operate our air-conditioning system at the first state and a second switching device actuated when another of the terminals receives a second control signal from the master controller to operate our air-conditioning system at the second state. The controller module operably connected between the encoding module and the switch module actuates the encoding module and the antenna module to transmit the encoded radio frequency signal. The controller module upon actuation of the first switching device signals the encoding module to apply the first digitally encoded message to the radio frequency signal when the first control signal is applied to the one terminal of the master controller and signals the encoding module to generate the second digitally encoded message when the second control signal is applied to another terminal of the master controller. In one embodiment, the connector has four terminals.

Four, our receiver device may include a connector, an antenna module, a decoding module, and a switch module. The connector includes a plurality of terminals each configured to be connected individually to an operational control device for the air-conditioning system so that a first control signal applied to one terminal operates the air-conditioning system at a first state and a second control signal applied to another terminal operates the air-conditioning system at a second state. The antenna module receives radio frequency signals carrying different digitally encoded messages, a first digitally encoded message signaling that the air-conditioning system be operated at a first state and a second digitally encoded message signaling that the air-conditioning system be operated at a second state. The decoding module operably connected to the antenna module decodes the radio frequency signals and generates the first control signal upon decoding the first encoded message and generates the second control signal upon decoding the second encoded message. The switch module operably connected to the decoding module includes a first switching device actuated in response to the decoding module generating the first control signal that applies the first control signal to the one terminal to operate the air-conditioning system at the first state and a second switching device actuated in response to the decoding module generating the second control signal that applies the second control signal to the other terminal to operate the air-conditioning system at the second state. The transmitter's connector may have four terminals.

Five, when four terminals are used, for example, a first terminal is connected to one terminal of the transformer, a second terminal is connected to another terminal of the transformer, and a third terminal may be used to connect to a single stage compressor, and a forth terminal enables the receiver to be connected to (a) the switching device for the compressor and an additional switching device when the compressor is a two-stage compressor, or (b) an electro-mechanical device for operating a directional flow control valve for the compressor.

Six, in another embodiment, a pair of essentially identical control units, each including a transceiver module, is used. These identical control units are compact circuit boards that are easy to install and connect as required for the operation of our air conditioning system. The transceiver module is adapted to be connected electrically to a switching device for the compressor, and alternately is adapted to be electrically connected to the thermostat and responds to temperature changes to provide a temperature control signal. The transceiver module is responsive to a radio signal at a predetermined frequency to provide an electronic control signal for actuating the switching device. Alternately it is responsive to the temperature control signal to generate the radio signal and upon receipt of the temperature control signal transmits the radio signal at the predetermined frequency. The transceiver module when functioning to respond to the radio signal provides a confirmation signal to indicate that the radio signal has been received.

These features are not listed in any rank order nor is this list intended to be exhaustive.

DESCRIPTION OF THE DRAWING

Some embodiments of our air conditioning system, illustrating all its features, will now be discussed in detail. These embodiments depict our novel and non-obvious air conditioning system, control unit and other components used therewith as shown in the accompanying drawing, which is for illustrative purposes only. This drawing includes the following figures (Figs.), with like numerals indicating like parts:

FIG. 4A is a schematic wiring diagram for connecting the receiver of our air conditioning system to a solenoid that controls the operation of a directional control valve for the heat pump embodiment shown in FIG. 4.

FIG. 5 is a block diagram of the circuitry of the transmitter used in our air conditioning system.

FIG. 5B is a table (Table I) listing the parts used in the transmitter shown in FIG. 5.

FIG. 6 is a block diagram of the circuitry of the receiver used in our air conditioning system.

FIG. 6B is a table (Table II) listing the parts used in the receiver of shown in FIG. 6.

FIG. 8 is a table (Table III) listing the parts used in the control unit circuitry of shown in FIGS. 7 and 7A.

PRIOR ART

Figure 1:
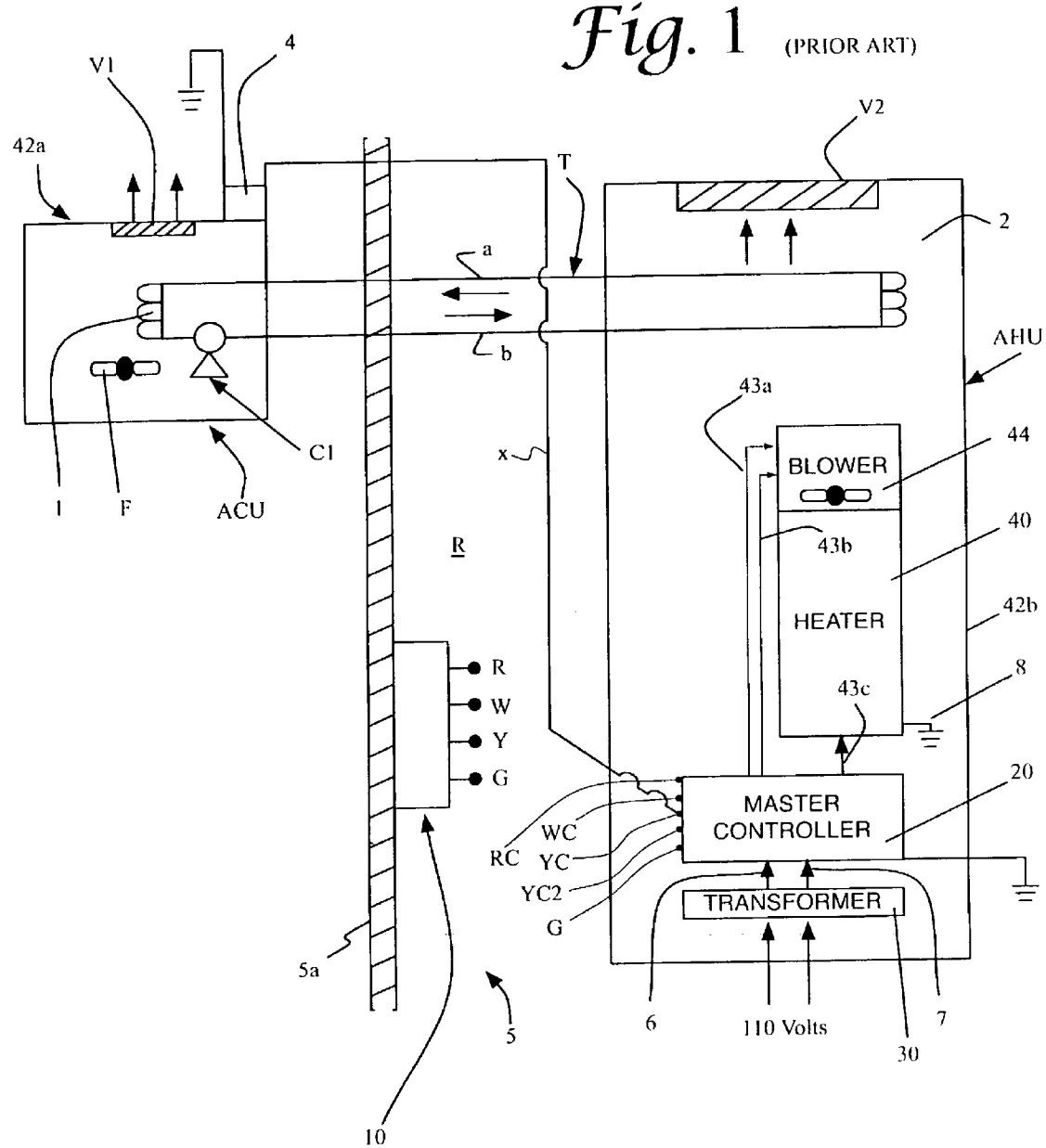
FIG. 1 is a schematic diagram of a conventional, prior art air handling and control unit.

FIG. 1 depicts a conventional air conditioning system for a building 5. This system includes an air-cooling unit ACU outside the building 5, an air-heating unit AHU inside the building, and a thermostat 10 attached to an interior surface of a building wall 5a of a room R inside the building. The air-cooling unit ACU includes an enclosure 42a housing a single stage compressor C1 and a fan F, and the air-heating unit AHU has an enclosure 42b housing a master controller 20, a blower 44, and a heater 40 grounded through a ground line 8.

Control wires R, W, Y and G from the thermostat 10 are electrically connected, respectively, to the master controller's terminals $R_C$, $W_C$, $Y_C$, and $G_C$. The master controller 20 includes an additional terminal $Y_{c2}$ for use with different air conditioning systems, as discussed subsequently. Command signals from the thermostat 10 are forwarded to the master controller 20 over the control wires R, W, Y and G. The master controller 20 is connected to a 110 volt power supply via a step down transformer 30 and power lines 6 and 7. The transformer 30 drops a 110 volt AC line power to 24 volt AC. Output wires 43a and 43b from the master controller 20 are operatively connected to the blower 44 and an output wire 43c is operatively connected to the heater 40. These wires 43a, 43b, and 43c transmit control signals from the master controller 20 to these air conditioning system components for turning them on and off as demanded by the thermostat 10. The blower 44 may be operated at a high speed when activated by a signal transmitted through the wire 43a and at a low speed when activated by a signal transmitted through the wire 43b.

A refrigerant such as, for example, Feron®, flows through an endless tubular line T having a pair of coils 1 and 2. The coil 1 is within the enclosure 42a, and the coil 2 is within the enclosure 42b. The enclosure 42a has an open vent V1 so that air blown past the coil 1 exchanges heat with refrigerant flowing through this coil 1 and escapes into atmosphere outside the building 5. The enclosure 42b also has an open vent V2 so that air blown past the coil 2 exchanges heat with refrigerant flowing through this coil 2 and escapes into the room R. The coil 1 functions as a condenser, and the coil 2 functions as an evaporator. In a heat pump HP (FIG. 4) as subsequently discussed, the coils 1 and 2 reverse functions as demanded by the thermostat 10. The compressor C1 compresses refrigerant that is in a gaseous state to liquefy it and also acts as a pump to push liquefied refrigerant though a segment b of the tubular line T through the coil 2. The liquefied refrigerant evaporates and expands into a gas as it absorbs heat from the air being blown over the coil 2 by the blower 44, reducing the temperature of this air. This refrigerant gas, which is at an elevated temperature as it leaves the coil 2, moves along the segment a of the tubular line T through the condenser coil 1 back to the compressor C1. The fan F blows cool outside ambient air over the coil 1, cooling the gasified refrigerant, which is compressed by the compressor C1 and becomes a liquid and is again cycled to the coil 2, if demanded by the thermostat 10.

A user sets the thermostat 10 to a specific temperature. This temperature is compared to the actual temperature inside the room R as measured by the thermostat 10, which determines if this actual room temperature needs to be increased or decreased. The thermostat 10 sends this information via control wires R, W, Y and G connected to the master controller 20. The master controller 20 uses this information to determine what component of the air conditioning system needs to be activated. For example, if the actual room temperature is below the user-selected room temperature, the master controller 20 in response to a command signal from the thermostat 10 activates the heater 40 until the user-selected room temperature is attained. If the room temperature is above the user-selected room temperature, the master controller 20 in response to a command signal from the thermostat 10 activates the compressor C1 to cycle refrigerant between the coils 1 and 2 until the room temperature is lowered to the user-selected room temperature, at which point the master control 20 deactivates the compressor C1 in response to a command signal from the thermostat 10.

A conductive wire X from a grounded electrical-mechanical relay 4 extends through the wall 5a to the master controller 20. In response to a command signal from the thermostat 10, the master controller 20 sends an electrical signal over the wire X to the relay 4. The relay 4 functions as a switching device to turn the compressor C1 on and off as signaled by the master controller 20. Consequently, if this wire X is severed, a difficult rewiring job may be required to reestablish a connection between the relay 4 and the master controller 20. This is the problem that the present invention overcomes.

DETAILED DESCRIPTION OF SOME ILLUSTRATIVE EMBODIMENTS

General

In all the embodiments of our air conditioning system a conductive wire to connect a master controller to a switching device that controls the operation of an air cooling unit or a heat pump is eliminated. Instead, our air conditioning system uses a transmitter within the building 5 and a receiver at a remote location exterior to the building to communicate with each other for controlling the operation of the system. Our air conditioning system also includes a novel transmitter, one embodiment thereof identified by the numeral 60, and a novel receiver, one embodiment thereof identified by the numeral 70. The transmitter used in our air conditioning system is discussed subsequently in greater detail in connection with FIGS. 5, 5A, and 5B, and the receiver used in our air conditioning system is discussed subsequently in greater detail in connection with FIGS. 6, 6A, and 6B.

Figure 3:
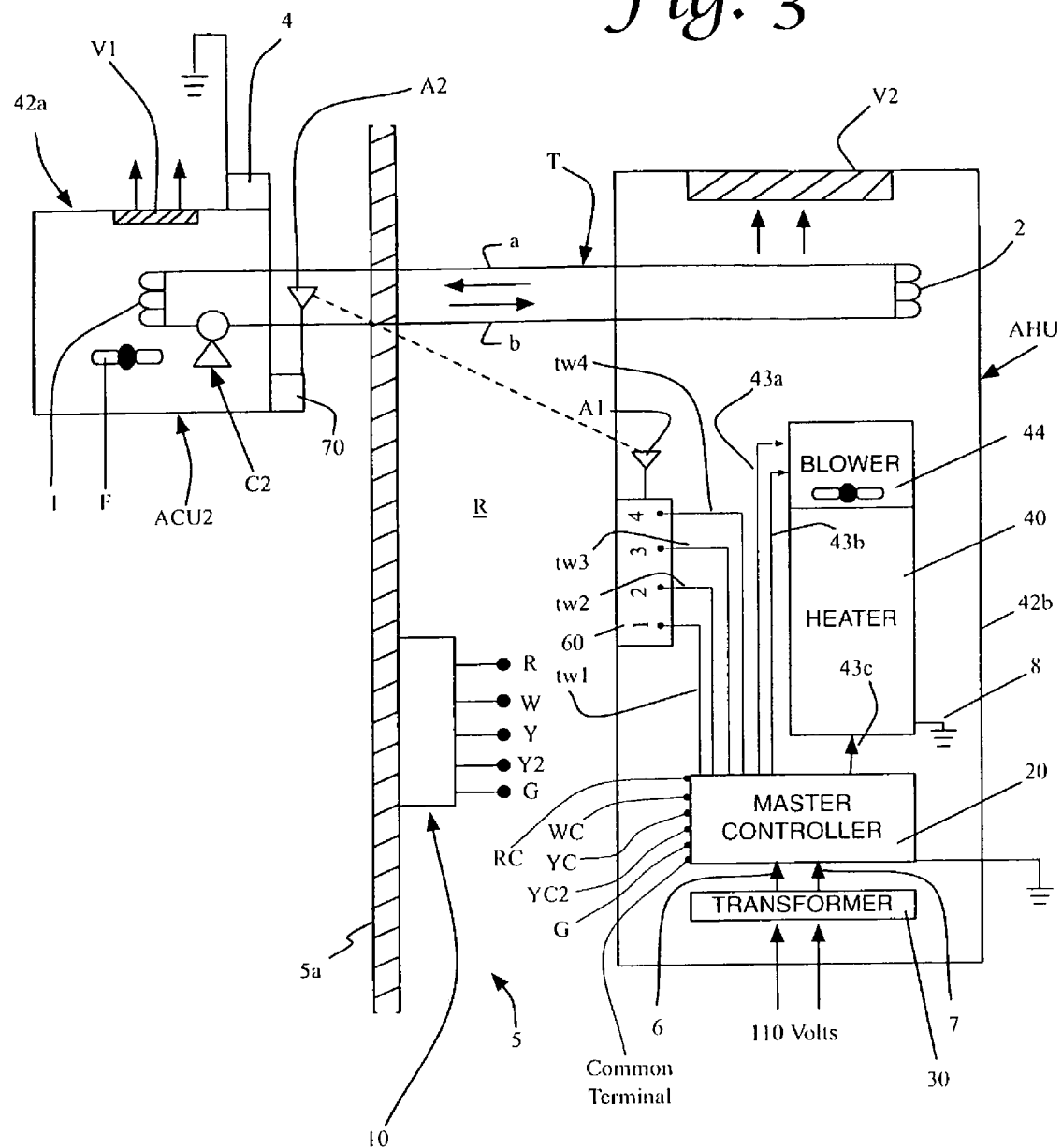
FIG. 3 is a schematic diagram of another embodiment of our air conditioning system where a two-stage compressor is used in the air-cooling unit.
Figure 4:
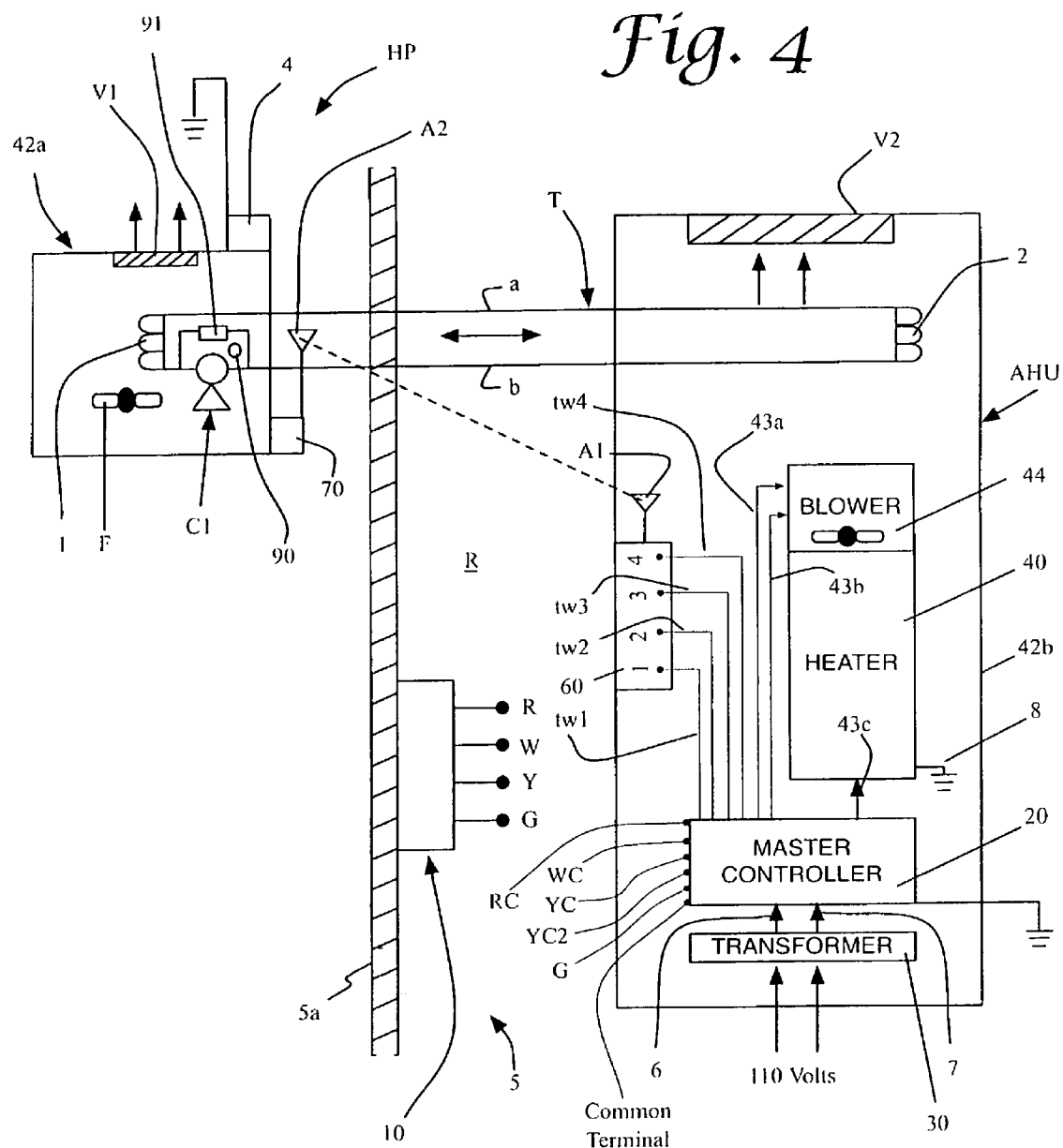
FIG. 4 is a schematic diagram of yet another embodiment of our air conditioning system where the air-cooling unit is a heat pump.

Signals from the transmitter 60 control the operation of an air-cooling unit or a heat pump. For example, to control the operation of (a) the air-cooling unit ACU1 (FIG. 2) using a single stage compressor C1 or (b) an air-cooling unit ACU2 (FIG. 3) using a two-stage compressor C2: a first stage operating the compressor C2 at a low speed and a second stage operating the compressor C2 at a high speed or (3) a heat pump HP (FIG. 4). In all these embodiments, the thermostat 10 is connected to the master controller 20 in the same way as the prior art system shown in FIG. 1.

The transmitter 60 broadcasts a radio frequency (RF) control signal via its antenna A1 to remote locations within a receiving zone, for example, within a radius of no greater than about 300 feet. The receiver 70 is within this receiving zone, and on picking up the radio frequency (RF) control signal through its antenna A2 energizes and de-energizes a switching device, for example, the relay 4. The receiver 70, in responsive to the RF control signal from the transmitter 60, controls the operation of the switching device. The transmitter 60 typically is within the building 5, for example, housed with the enclosure 42b, and is electrically connected to the thermostat 10 through the master controller 20.

The transmitter 60 and receiver 70 may include a plurality of terminals enabling them to be used in different types of air conditioning systems as shown in FIGS. 2 through 4A. Specifically, both the transmitter 60 and the receiver 70 each include the four terminals identify each by the numerals 1, 2, 3, and 4. In all the illustrated embodiments of our air conditioning system, four wires tw1, tw2, tw3, and tw4 from the master controller 20 are respectively connected to the terminals 1, 2, 3, and 4 of the transmitter 60. These wires tw1, tw2, tw3, and tw4 carry signals from the master controller 20 as commanded by the thermostat 10 to operate the transmitter 60.

The terminals 1, 2, 3, and 4 of the receiver 70 are connected differently depending on the embodiment of our air conditioning system. FIG. 2A shows receiver terminals 1 and 2 connecting the receiver 70 to a step down transformer 80 to reduce 220 Volt power applied to the receiver 70. One of the two receiver terminals connected to the step down transformer 80, namely, the terminal 2, and the receiver terminal 3 are connected across the electrical-mechanical relay 4, applying to this relay the stepped down voltage. The receiver terminal 4 is used in different ways depending upon the type of air conditioning system being controlled. It may be used to connect the receiver 70 to a second switching device 200 (FIG. 3A) used with the two-stage compressor C2 (FIG. 3). Or, as shown in FIG. 4A it may be used to connect the receiver 70 to a solenoid 90 that operates a directional control valve 91 (FIG. 4) employed in the heat pump HP shown in FIG. 4.

Figure 2:
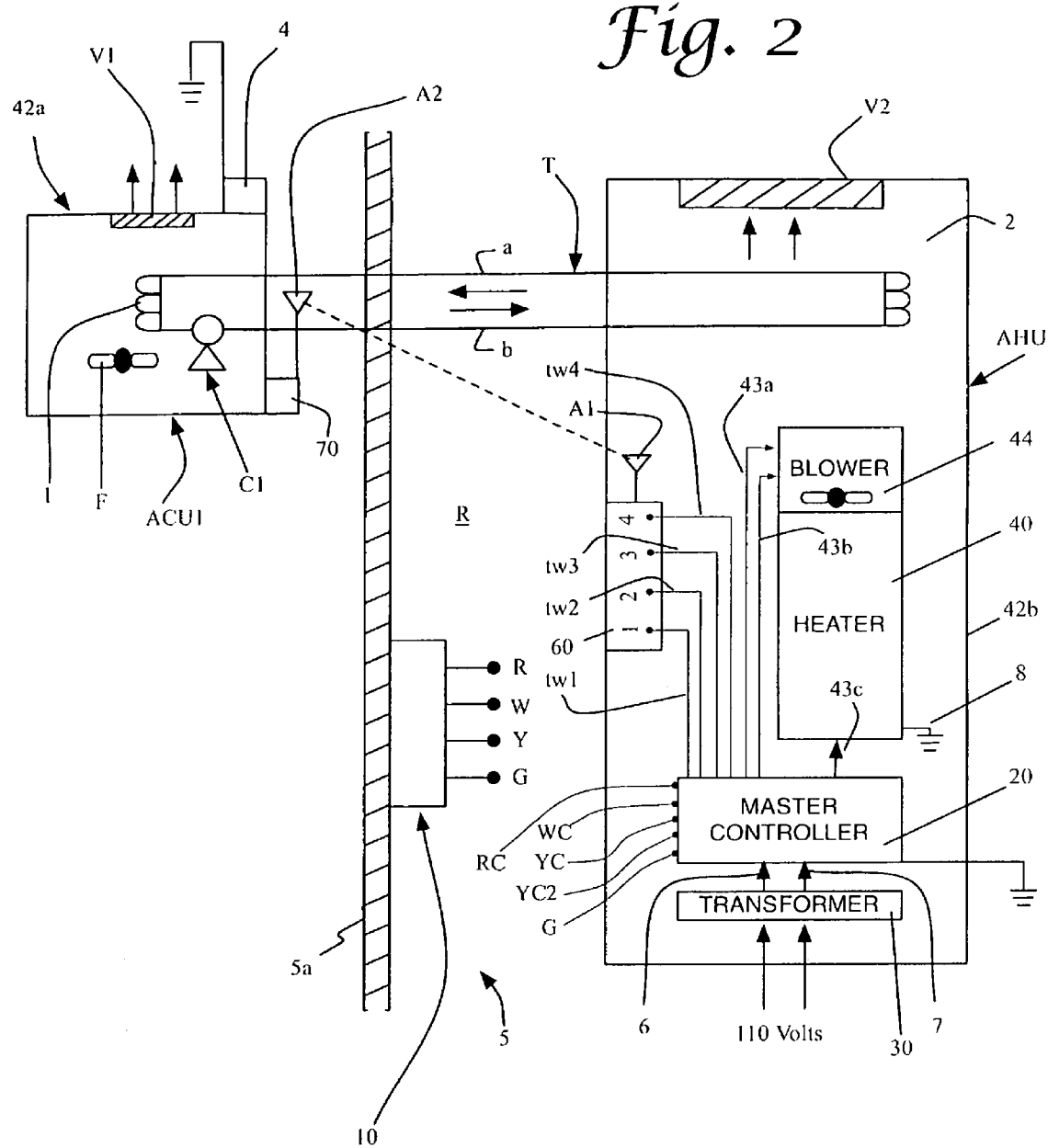
FIG. 2 is a schematic diagram of one embodiment of our air conditioning system.
Figure 2A:
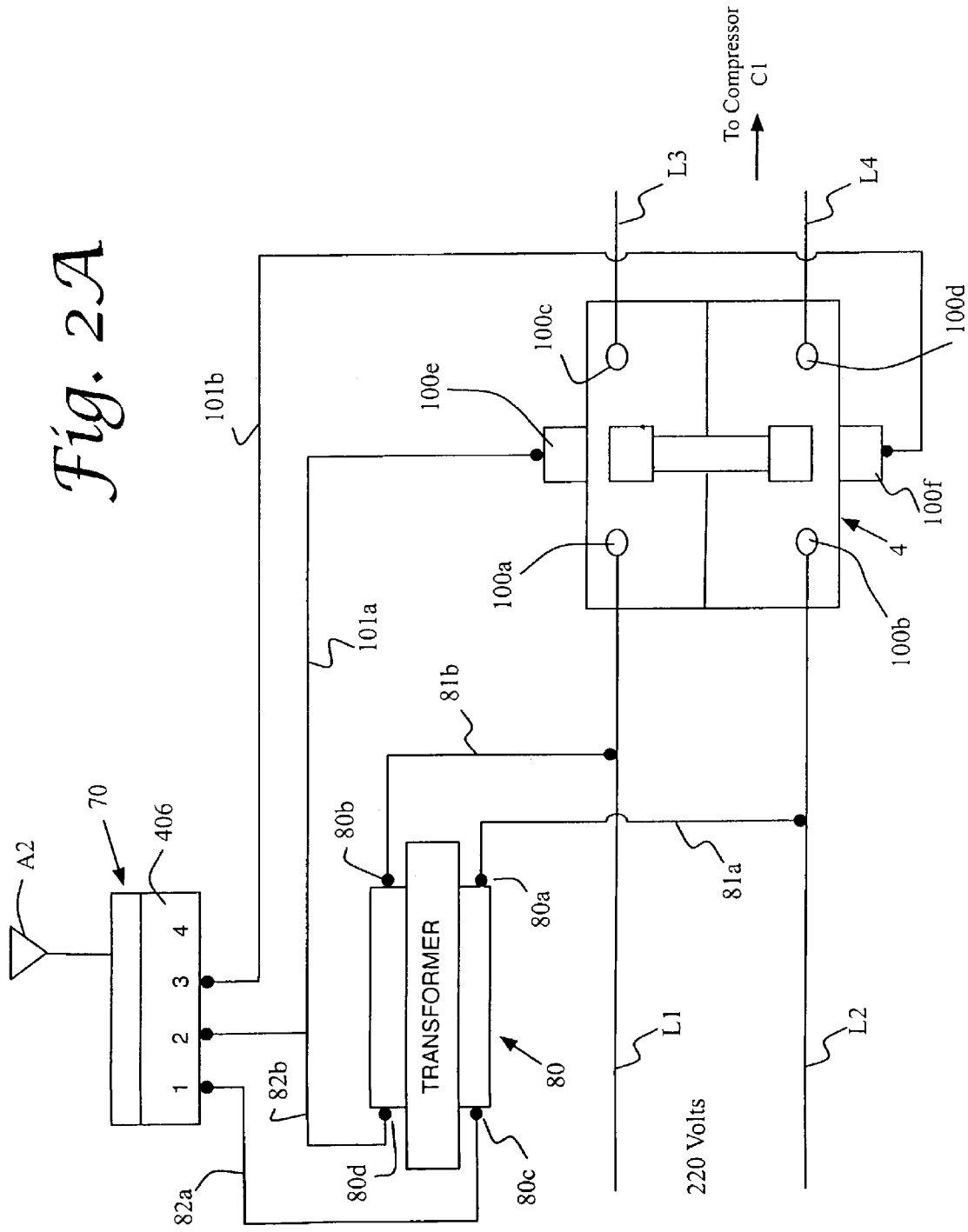
FIG. 2A is a schematic wiring diagram for connecting the receiver of our air conditioning system with a relay for a single stage compressor used in the embodiment shown in FIG. 2.

FIGS. 2 and 2A

As illustrated in FIG. 2, this embodiment of our air conditioning system is essentially the same as the prior art system shown in FIG. 1, except the wire X from the air-cooling unit ACU1 is eliminated. In place of this wire X the transmitter 60 and receiver 70 are used. The transmitter 60 may be located in the enclosure 42 of the air-heating unit AHU. The receiver may be located on or within a housing 52 of the air-cooling unit ACU1 or very near thereto. The transmitter 60 is operatively connected to the thermostat 10 through the master controller 20. The receiver 70 is operatively connected to the relay 4, which is operatively connected to the compressor C1. The receiver 70, in responsive to the RF control signal from the transmitter 60, energizes and de-energizes the relay 4, turning the compressor C1 on and off.

This RF control signal from the transmitter 60 is picked up by the antenna A2 of the receiver 70, which then converts this radio signal back into the information that was originally transmitted by the thermostat 10 to the master controller 20. For example, if the room temperature is above the user-selected room temperature, the master controller 20 in response to a signal from the thermostat 10 activates the transmitter 60 to signal the receiver 70 to energize the relay 4 to turn on the compressor C1. For as long as the actual room temperature is above the user-selected room temperature, the transmitter 60 intermittently sends an RF control signal indicating that the compressor C1 to remain on to cycle refrigerant between the coils 1 and 2 until the room temperature is lowered to the user-selected room temperature. When the actual room temperature attains the user-selected room temperature, the master controller 20, in response to a signal from the thermostat 10 transmitted through the wire Y activates the transmitter 60 to send an RF control signal to the receiver 70 to de-energize the relay 4 to turn off the compressor C1. If the actual room temperature is below the user-selected room temperature, the master controller 20, in response to a signal from the thermostat 10, activates the heater 40 until the user-selected room temperature is attained.

As depicted in FIG. 2A, 220 volt AC power is applied to the compressor C1 when a control signal indicates turning on this compressor. The step down transformer 80 reduces the 220 volt AC line power to 24 volt AC power that is supplied to the receiver 70 and the relay 4. A pair of lines L1 and L2 carrying the 220 volt AC power are connected to input terminals 100a and 100b of the relay 4. Wires 81a and 81b connect the 220 volt AC power to the input terminals 80a ands 80b of the transformer 80. Wires 82a and 82b from the output terminals 80c ands 80d of the transformer 80 are respectively connected to terminals 1 and 2 of the receiver 70. Wires 101a and 101b from terminals 2 and 3 of the receiver 70 are respectively connected across input terminals 100e and 100f of the relay 4. Output terminals 100c and 100d of the relay 4 are connected to lines L3 and L4 that forward the 220 volt AC power to the compressor C1.

Terminal 4 of the receiver 70 is not used in this embodiment, but is used in other embodiments subsequently discussed.

Figure 3A:
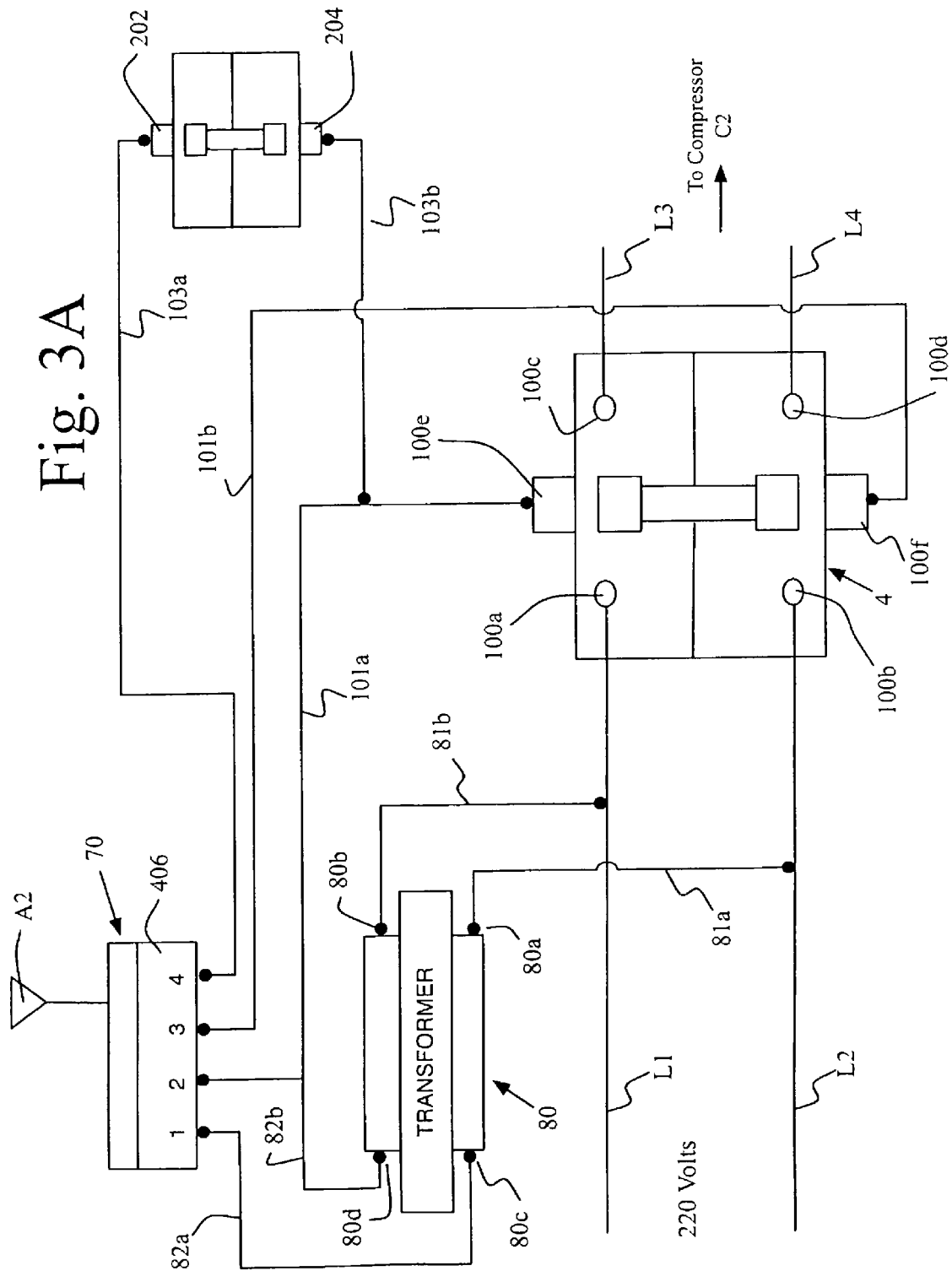
FIG. 3A is a schematic wiring diagram for connecting the receiver of our air conditioning system to a relay for the two stage compressor used in the embodiment shown in FIG. 3.

FIGS. 3 and 3A

As illustrated in FIGS. 3 and 3A, this embodiment of our air conditioning system is essentially the same as the embodiment shown in FIGS. 2 and 2A, except the terminals 4 of the transmitter 60 and receiver 70 are used in controlling the operation of the two-stage compressor C2: One stage is under the control of the relay 4 and the other stage is under the control of the second switching device 200, an electro-mechanical device like relay 4. As shown in FIG. 3A, a wire 103a connects terminal 4 of the receiver 70 to one terminal 202 of the second switching device 200 and a wire 103b connects another terminal 204 of the second switching device 200 to an input terminal 100e of the relay 4.

In this embodiment employing the two-stage compressor C2, in addition to the control wire Y from the thermostat 10, a second wire $Y_2$ connects the thermostat 10 to the terminal $Y_{c2}$ of the master controller 20. At a threshold thermostat temperature setting, a control signal is transmitted over the wire Y to the master controller 20 and via the wire Yc and the wire tw3 to the transmitter 60 that is actuated to transmit a RF control signal to the receiver 70 to energize the relay 4, operating the first stage of the compressor C2. At a thermostat temperature setting below this threshold thermostat temperature setting, a control signal is transmitted over the wire $Y_2$ and the wire $Yc_2$ to the master controller 20 and via the wire tw4 the transmitter 60 that is actuated to transmit a second RF control signal to the receiver 70 to energize the second switching device 200. Using a conventional two-stage compressor C2, both switching devices 4 and 200 are activated to operate the second stage of the compressor C2.

FIGS. 4 and 4A

As illustrated in FIGS. 4 and 4A, this embodiment of our air conditioning system functions as a heat pump HP. This heat pump HP is essentially the same as the embodiment shown in FIGS. 2 and 3, except a reversing valve 91 (FIG. 4) directs the flow of refrigerant through the tubular line T in either a clockwise or counter-clockwise direction. The reversing valve 91 has two positions: one that directs the flow of refrigerant in a clockwise direction; the other that directs the flow of refrigerant in a counter-clockwise direction. The positions of the reversing valve 91 are under the control of the solenoid 90 (FIG. 2A).

Because this embodiment functions as a heat pump, not only does the receiver 70 need to be able to energize and de-energize the relay 4, it also needs to energize and de-energize the solenoid 90. When refrigerant flows in a counter-clockwise direction, the heat pump works like a normal air conditioner, cooling the air in the room R. The master controller 20 turns on the blower 44 whenever the air conditioning system of this embodiment is activated by the demands of the thermostat 10, circulating room air. Under these conditions the coil 2 serves as an evaporator and the coil 1 serves as a condenser. When the flow of the refrigerant is in a clockwise direction, the air conditioning system of this embodiment works like a heater, heating the circulating room air, with the coil 1 serving as an evaporator and coil 2 serving as a condenser.

As shown in FIG. 4A, the terminal 4 of the receiver 70 is connected by a wire 96a to a solenoid terminal 92a. A solenoid terminal 92b is connected by a wire 96b to the input terminal 100e of the relay 4. Thus, depending on whether the receiver 70 receives from the transmitter 60 a RF control signal requesting hot or cold air, the receiver 70 will either energize the solenoid 90 or not. For example, in a de-energized state the position of the valve 91 causes the refrigerant to flow in a counter-clockwise direction, cooling room air. In an energized state the position of the valve 91 causes the refrigerant to flow in a clockwise direction, heating room air. Depending on the temperature setting of the thermostat 10, the master controller 20 may turn on the heater 40 to provide supplemental heat to the room R.

Transmitter

Figure 5A:
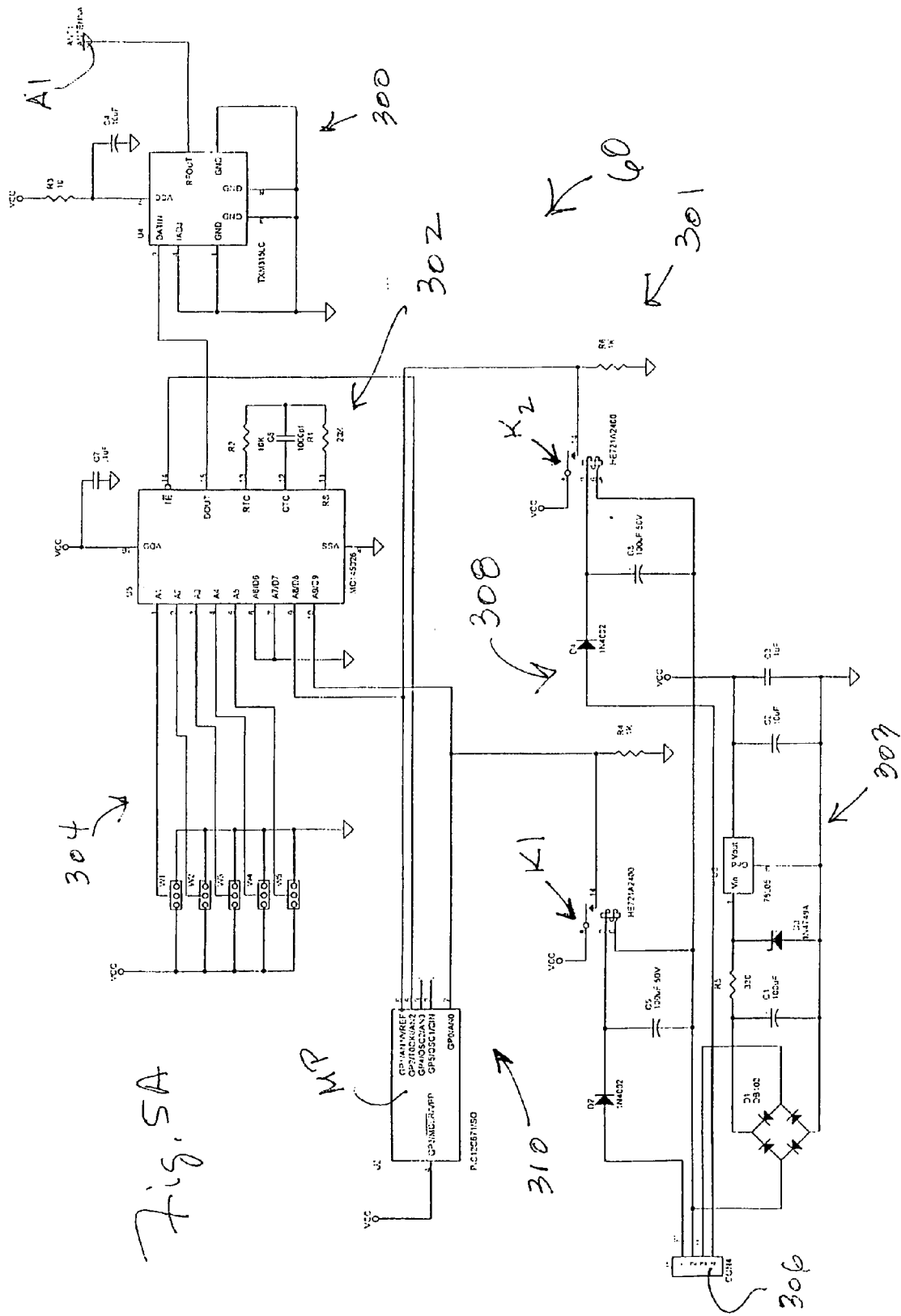
FIG. 5A is a schematic wiring diagram of the circuitry of the transmitter shown in FIG. 5.

The block diagram of FIG. 5 illustrates the transmitter 60, which is an electrical circuit 301 (FIG. 5A) with the parts of this circuit set forth in Table I (FIG. 5B). These parts, which include a microcontroller or microprocessor MP programmed in a conventional manner, are connected together in a conventional manner to provide the modules comprising the transmitter 60 and a power supply 303 that converts 24 volt alternating current (AC) to 5 volt direct current (DC) that drives the transmitter. This circuit 301 has an antenna module 300, including the antenna A1. The antenna module 300 generates a radio frequency signal and it is operably connected to an encoding module 302 that applies a digitally encoded message to the radio frequency signal. The encoding module 302 is operably connected a code selector module 304 that enables an installer to set the encoding module with a unique code suitable so that the radio signal is transmitted at a frequency suitable for the location of the air-conditioning system. For example, the code may be set to avoid any signal interference present in the vicinity of the air-conditioning system. The encoded radio frequency signal is transmitted by the antenna module 300 to the receiver 70.

The digitally encoded messages carried by radio frequency signal operate any one of the air-conditioning systems depicted in FIGS. 2, 3, and 4 in one of two different operating states as determined by the encoded message. Each of these air-conditioning systems depicted in FIGS. 2, 3, and 4 has a first operating state and a second operating state. For example, as depicted in FIG. 2, the first operating state is when the relay 4 is energized to turned on the compressor C1 and the second operating state is when the relay 4 is de-energized to turn off the compressor C1. Another example is the embodiment of our air conditioning system depicted in FIG. 3 employing the two-stage compressor C2. In this example, in the first operating state the compressor C2 is under the control of the relay 4 and in the second operating state the compressor C2 is under the control of the second switching device 200. Still another example is depicted in FIG. 4 where the reversing valve 91 directs the flow of refrigerant through the tubular line T in either a clockwise or counter-clockwise direction. In the first operating state the reversing valve 91 is positioned to direct the flow of refrigerant in a clockwise direction and in the second operating state the valve is positioned to direct the flow of refrigerant in a counter-clockwise direction.

In accordance with one feature of our air conditioning system, a connector 306 that includes the four receiver terminals identify by the numerals 1, 2, 3, and 4 is connected to the power supply 303. Each of these terminals 1, 2, 3, and 4 is configured to be connected individually to the master controller 20 for an air-conditioning system so that a first control signal applied to one terminal 1, 2, 3, or 4, as the case may be, operates the air-conditioning system at a first state and a second control signal applied to another terminal 1, 2, 3, or 4, as the case may be, operates the air-conditioning system at a second state. A switch module 308 operably connected to the connector 306 includes a first switching device, for example the relay K1 (FIG. 5A), actuated when one of the connector terminals receives a first control signal from the master controller 20 to operate the air-conditioning system at the first state and a second switching device, for example the relay K2 (FIG. 5A), actuated when another of the terminals receives a second control signal from the master controller 20 to operate the air-conditioning system at the second state.

A controller module 310, including the programmed microprocessor MP, is operably connected between the encoding module 302 and the switch module 308. The controller module 310 actuates the encoding module 302 and the antenna module 300 to transmit the encoded radio signal. The encode message applied to the radio signal, however, depends on which of the terminals 1, 2, 3, or 4 of the connector 306 receives an operating control signal from the master controller 20.

For example, in response to the master controller 20 receiving a temperature control signal from the thermostat 10 indicating that the room temperature is to high, the master controller 20 applies the operating control signal to terminal 3 (wire tw3) of the connector This actuates the encoding module 302 to generates a first digitally encoded message applied to the radio frequency signal for operating the air-conditioning system at a first state, in this example, turning on the compressor C1. When the desired cool room temperature isn't reached within a suitable time period, the thermostat 10 sends to the master controller 20 another temperature control signal and the master controller 20 responds to apply the operating control signal to the terminal 4 (wire tw4) of the connector 306. This actuates the encoding module 302 to generate a second digitally encoded message applied to the radio frequency signal for operating the air-conditioning system at a second state, in this example, turning off the compressor C1.

Receiver

Figure 6A:
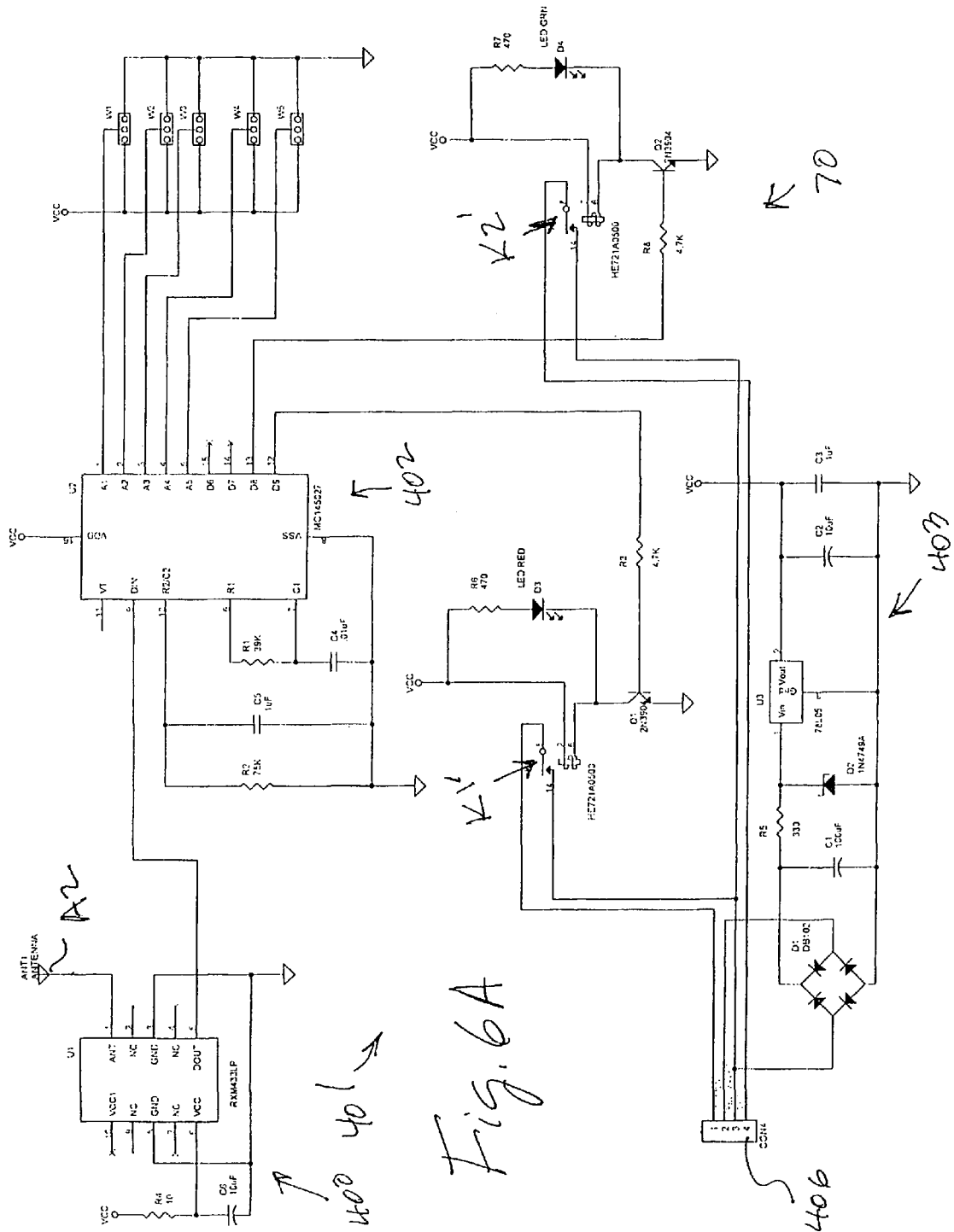
FIG. 6A is a schematic wiring diagram of the circuitry of the receiver shown in FIG. 6.

The block diagram of FIG. 6 illustrates the receiver 70, which is an electrical circuit 401 (FIG. 6A) with the parts of this circuit set forth in Table II (FIG. 6B). These parts are connected together in a conventional manner to provide the modules comprising the receiver and a power supply 403 that converts 24 volt alternating current (AC) to 5 volt direct current (DC) that drives the receiver.

The receiver 70 includes a connector 406 including the receiver terminals 1, 2, 3, and 4. Each receiver terminal 1, 2, 3, and 4 is configured to be connected individually to an operational control device for one of the air-conditioning systems illustrated in FIGS. 2, 3, or 4. This operational control device may be the relay 4 in the air-conditioning system illustrated in FIG. 2; it may be the switching device 200 (FIG. 3A) in the air-conditioning system illustrated in FIG. 3; or it may be the solenoid 90 (FIG. 4A) in the air-conditioning system illustrated in FIG. 2.

An antenna module 400 receives the radio signals carrying the different digitally encoded messages from the transmitter 60, and a decoding module 402 is operably connected to the antenna module. The decoding module 402 is operably connected to a code selector module 404 and to a switch module 410, including, for example, the relays K1' and K2' (FIG. 6A). The code selector module 404 is set by the installer to match the setting of the transmitter code selector module 304. In other words, the installer adjusts the settings of both code selector modules 304 and 404 so the encoded signals from the transmitter 60 may be decoded by the receiver 70. One digitally encoded message signals an air-conditioning system to be operated at a first state and another digitally encoded message signals this air-conditioning system be operated at a second state.

The decoding module 402 decodes the encoded radio signals and actuates either the relay K1' or K2' to generate different control signals applied to one of the receiver terminals 1, 2, 3, or 4 on the connector 406, depending on the coded message received. For example, in the air-conditioning system illustrated in FIG. 2, the relay 4 is actuated in response to the decoding module generating a control signal indicating that the compressor C1 be turned on because the thermostat 10 detects an elevated room temperature. The control signal is applied to, for example, the receiver connector terminal 3 of the connector 406 to operate the compressor C1. When the thermostat 10 detects the room temperature has been lowered to the desired temperature, a control signal from the decoding module 402 actuates the relay K2' that applies this second control signal to the receiver connector terminal 3 to turn off the compressor C1.

Transceiver

Figure 7:
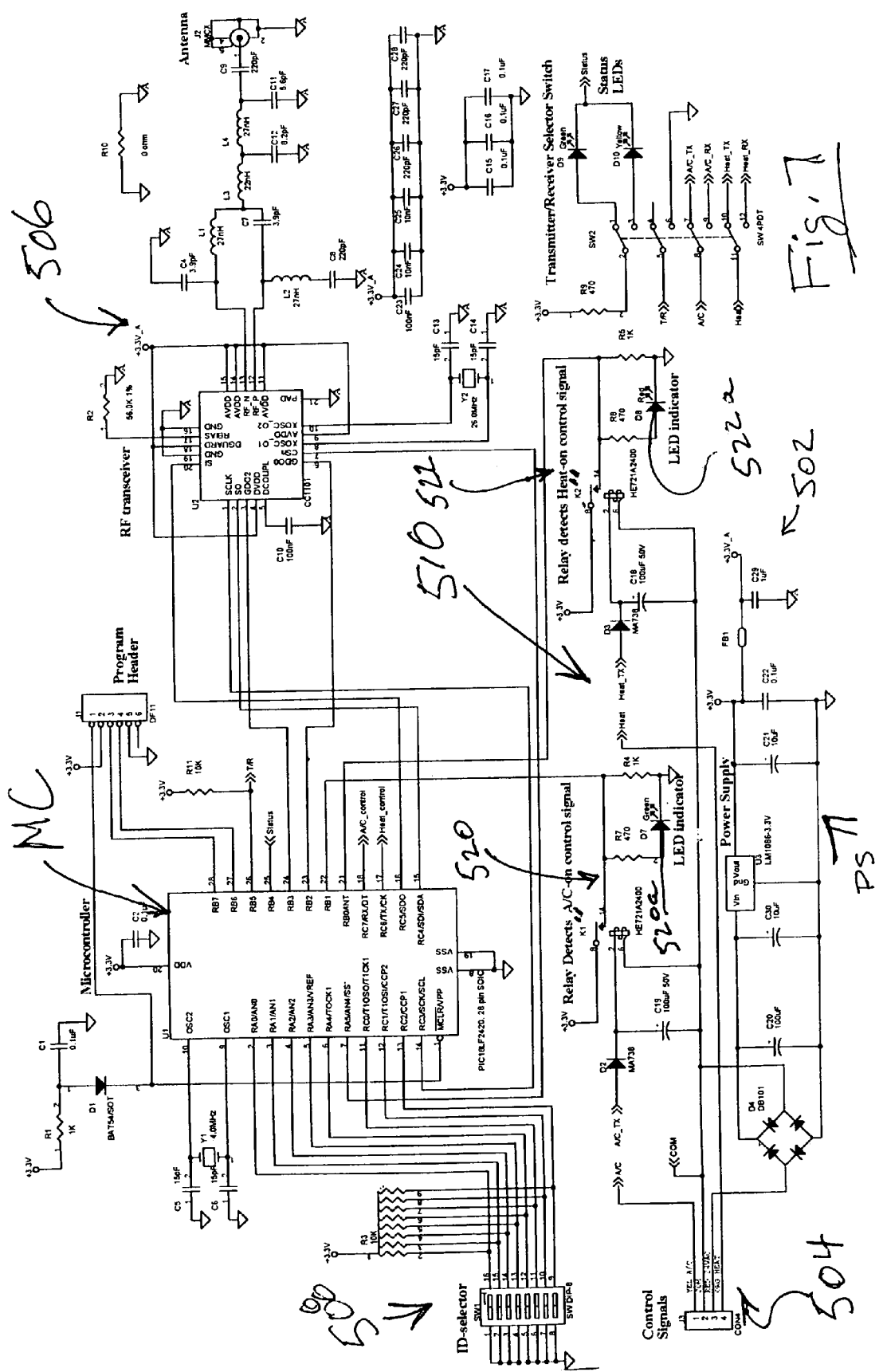
FIGS. 7 and 7A are schematic wiring diagrams of the circuitry for an alternate embodiment of our control unit for our air conditioning system where transceivers replace the transmitter and receiver of the other embodiments depicted in FIGS. 1 through 6B.

The embodiments of our air conditioning system discussed above may be modified to use a transceiver to replace the transmitter 60 and another transceiver to replace the receiver 70. These transceivers both send and receive radio frequency (RF) signals that may be coded. Another embodiment of our control unit, which is generally designated by the numeral 502 in FIG. 7, is designed to have a dual function and may be connected to the air-cooling/heating equipment or alternately the thermostat.

Figure 7A:
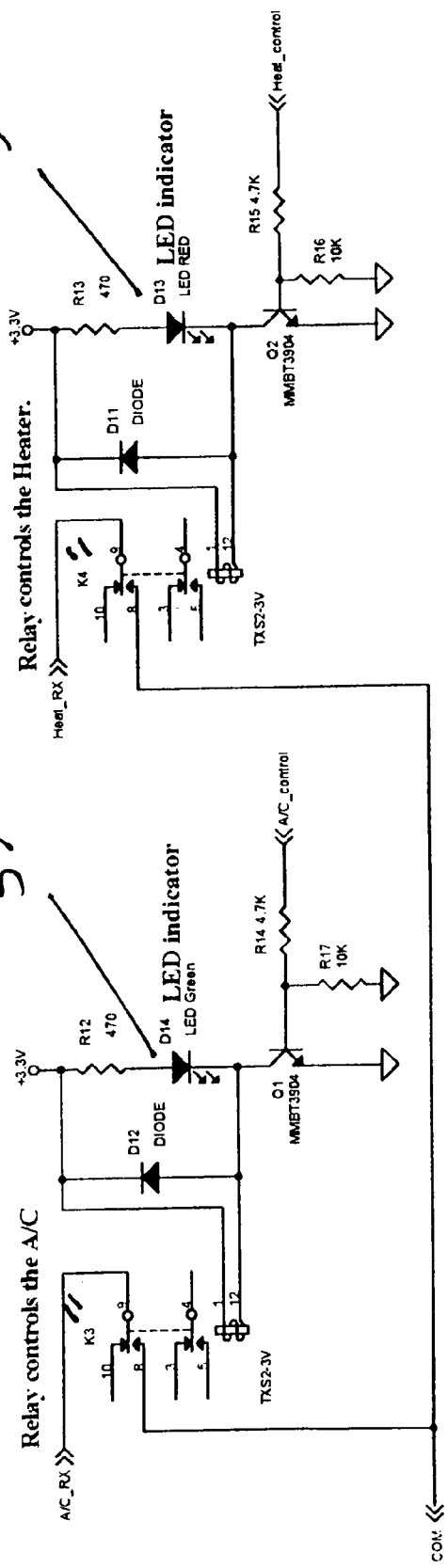
Figure 9:
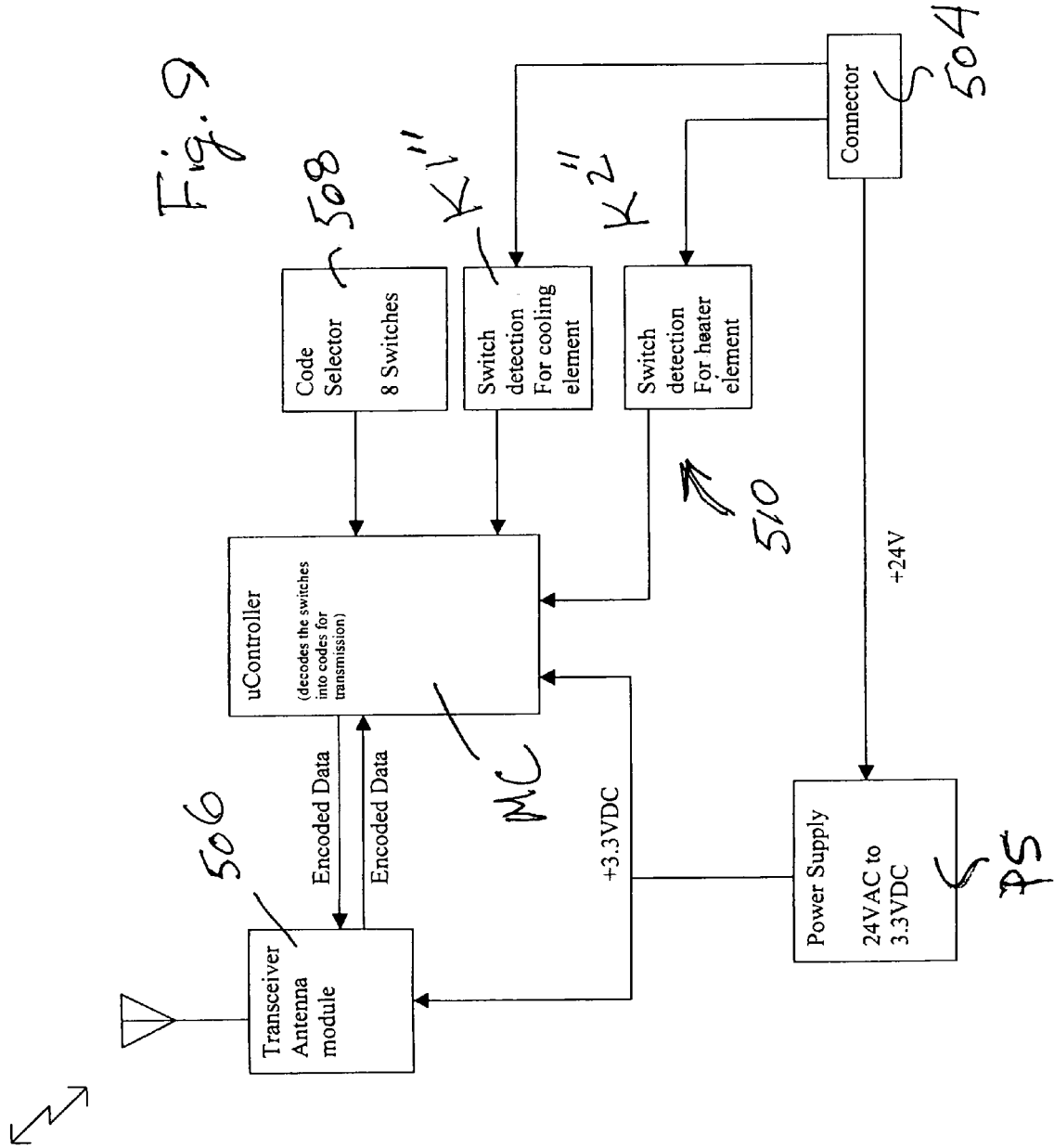
FIG. 9 is a block diagram of the circuitry shown in FIGS. 7 and 7A functioning to transmit a command signal to the compressor.
Figure 10:
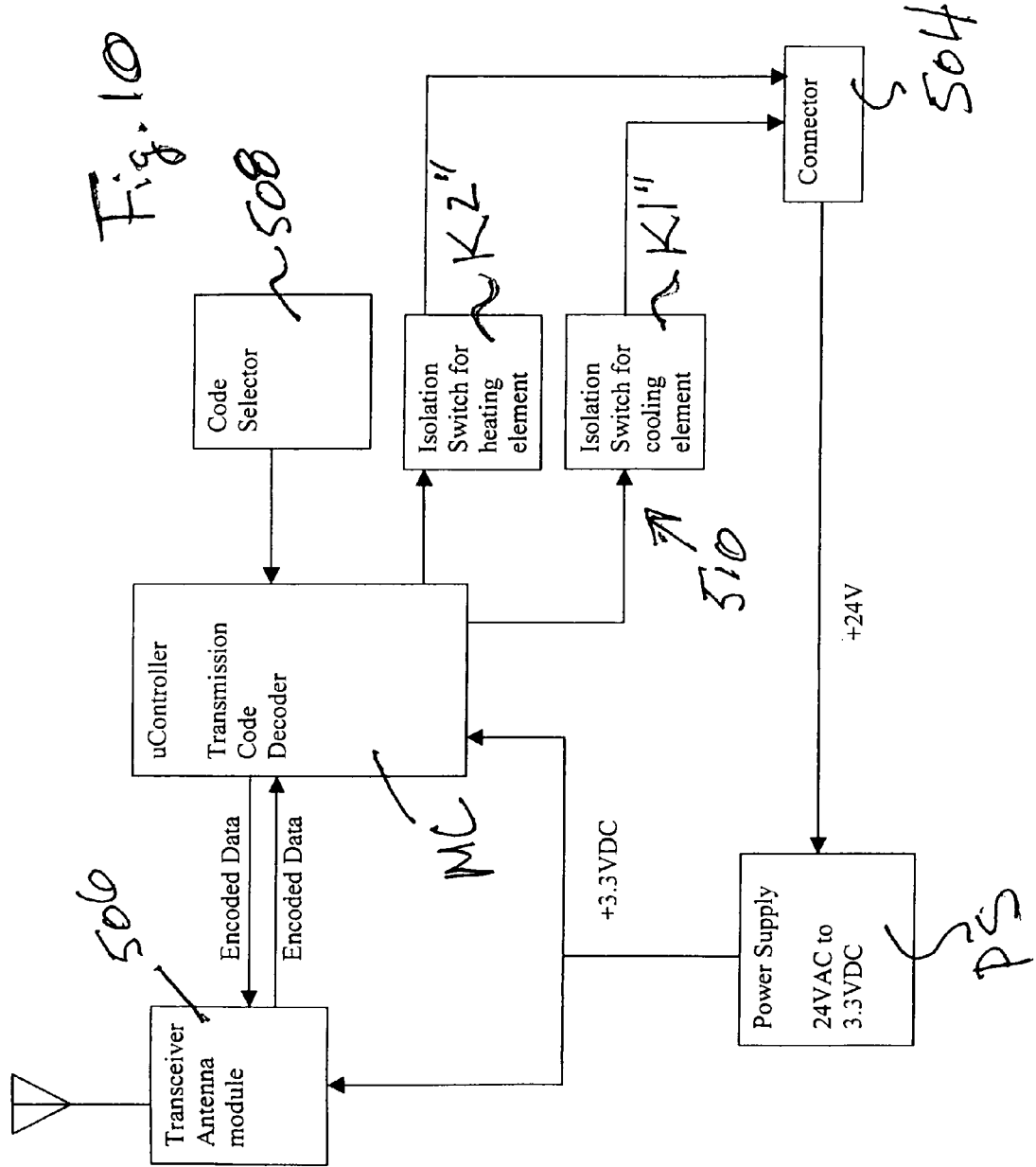
FIG. 10 is a block diagram of the circuitry shown in FIGS. 7 and 7A functioning to receive a command signal for operating the compressor.

The control unit 502 is a circuit board including a connector 504 with the appropriate four terminals 1, 2, 3 and 4 as discussed above so that the control unit may be used with a single stage compressor, a two-stage compressor, or a heat pump, and a step down transformer in a power supply PS to reduce the power line voltage from +24 volts AC current to 3.3 volts DC current. Or alternately, the control unit 502 may be connected between the thermostat 10 and the master controller 20. The other main components of the control unit 502 are a transceiver module 506, a microcontroller MC, a code selector module 508, an air-cooling unit module 520 and an air heating unit module 522. The air-cooling unit module 520 is operable when the air-cooling unit is being used and includes a rely K1" and a LED 520a. The air heating unit module 522 is operable when the air heating unit is being used and includes a rely K2" and a LED 522a. If the transceiver module 506 signals that the command signal has not been received, the LED 520a or 522a will be illuminated, for example, as a yellow light to indicate that commend signal is not being received. As shown in FIG. 7A, LED 530 and 532 are selectively energized when one of the relays K3" or K4" is activated to indicate whether the air-cooling unit is operating (a green light) or the air heating unit is operating (a red light).

Figure 11:
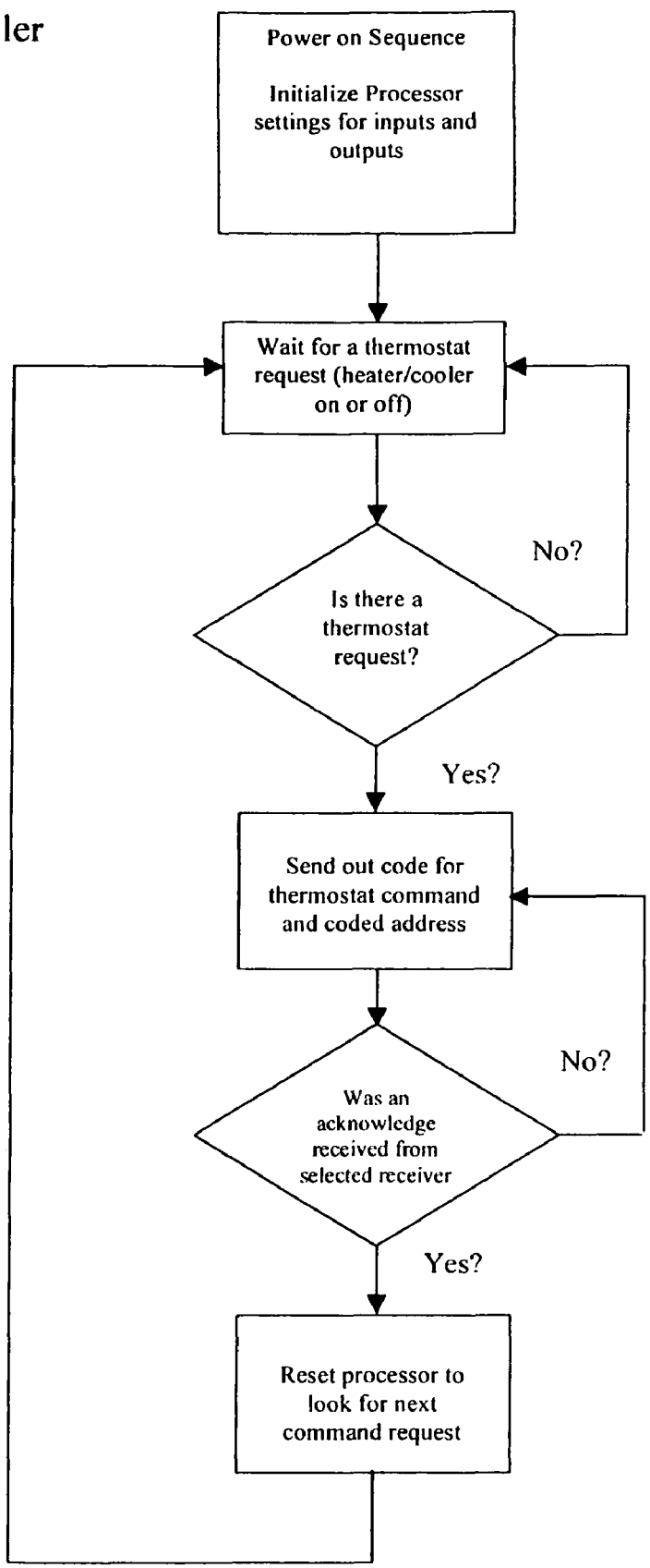
FIG. 11 is a process flow diagram of the thermostat controller of the circuitry shown in FIGS. 7 and 7A.
Figure 12:
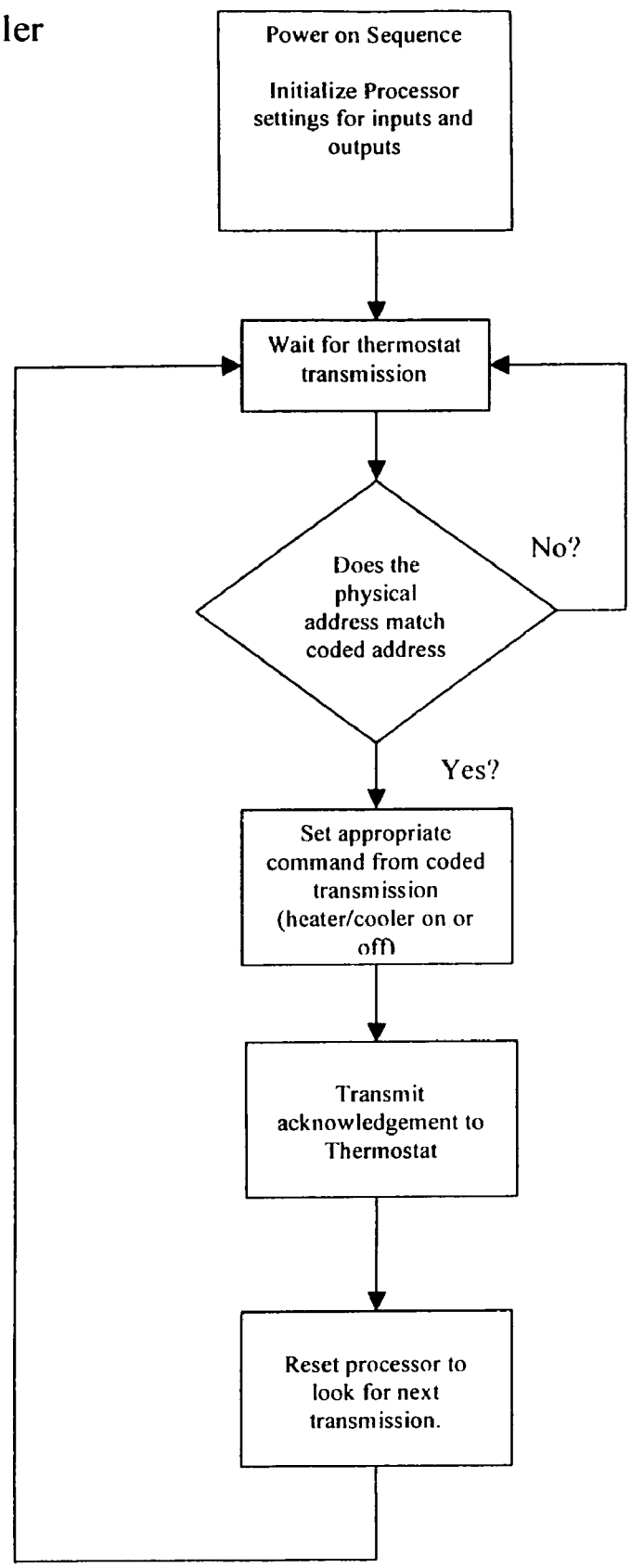
FIG. 12 is a process flow diagram of the receiver controller of the circuitry shown in FIGS. 7 and 7A.

Two such control units 502 are typically used. One control unit 502 is operably connected to the thermostat 10 and functions as a thermostat transmitter. In FIG. 11 this control unit 502 is designated as the thermostat controller, and its operation under the control of the microcontroller MC is shown. A second identical control unit 502 is operably connected to the compressor C1 or C2 or heat pump as depicted in FIG. 4, as the case may be, and its transceiver module 506 functions as a receiver. In FIG. 12 this second control unit 502 is designated as the receiver controller, and its operation under the control of the microcontroller MC is shown. After receiving a command signal, the second control unit 502 functioning as the receiver controller sends an RF signal back to the back the thermostat controller to acknowledge or confirm that the command signal was received.

When the first of the pair of control units 502 is functioning as the thermostat transmitter, it sends a coded RF command signal to the transceiver module 506 in the receiver controller of the second control unit. Then, the transceiver module 506 in the receiver controller sends a coded RF confirmation signal to the transceiver module 506 in the first control unit serving as the thermostat controller to indicate that this transceiver module 506 in the receiver controller received the RF command signal. The RF command signal to the air-cooling and heating module 510 turns on or off the heating unit AHU, or turns on or off the air-cooling units ACU1 (FIG. 2) or ACU2 (FIG. 3), as the case may be, or energizes or de-energizes the solenoid 90 that operates the directional control valve 91 (FIG. 4) employed in the heat pump HP shown in FIG. 4.

Our control unit 502 (a) allows the system to receive the command signal and send an acknowledgement out that the correct signal has been sent, (b) allows for a code to be set to allow it to be paired to the correct controller, (c) runs on the transformed AC signal from the heating/air-cooling module 510 to power the control unit 502, and (d) sets appropriate relay contacts. The thermostat controller (a) allows the control unit 502 to read the contact closure of a temperature controller and send that contact closure event through an RF link to the air-cooling and heating module 510, (b) allows for a code to be set to allow it to be paired to the correct controller unit, and (c) runs on the transformed AC signal from the heating/air-cooling module 510 to power the control unit 502, Our control unit 502 also interfaces to the thermostat 10, transmits the temperature information to the receiver controller, authenticates the command signal, which is coded, from the thermostat controller. The air-cooling and heating module 510 has an ID selector 508 that provides a coded command signal, insuring that the transmission came from the correctly paired controller. If it receives the correct coded signal, then when functioning as the receiver controller will send an acknowledgement or confirmation signal back to the thermostat controller, which is received by its transceiver module 506. If the thermostat controller does not receive the correct acknowledgement, it will resend the command signal again. It will try to send the command if necessary three times total, then it will energize a light indicator such as, for example, the yellow LED 520a or 522a, as the case may be.

Conclusion

The transmitter and receiver devices, or transceiver device, used in our air conditioning system are designed to interact with standard air-conditioning systems of different types. These devices include multiple terminals. The number of transmitter terminals corresponds to the number of terminals of the receiver. The most useful number of terminals is four, enabling these devices to be installed in a standard air-cooling unit, or a heat pump unit, or a two stage air-cooling unit without having to alter the standard arrangement of any these units.

Some illustrated embodiments employ an individual receiver and individual transmitter. One embodiment depicts using transceivers instead of an individual receiver and an individual transmitter. Such transceivers have the capability to both sending and receiving radio frequency signals. Our control unit employing a transceiver has a dual function, and consequently, a pair of such transceiver control units each essentially identical to the other are used in one embodiment of our air conditioning system. One transceiver control unit operably connected to the thermostat and the other operably connected to the air-cooling and heating unit.

The benefits of our air conditioning system include, but are not limited to: (1) A wireless connection between a master controller and an air-cooling/heating equipment. (2) A system that allows for quick replacement of damaged wires connecting a master controller and an air-cooling unit. (3) A system that allows for easy installation of an external air-cooling unit without the need to run wires from a master controller to the air-cooling unit. (4) A single radio frequency transmitter and a single radio receiver capable of activating a standard air-cooling unit, a heat pump unit, or a two stage air-cooling unit without having to alter the setup of the units or the transmitter and receiver. (5) Identical control units using a transceiver may be employed and a confirmation signal is used to insure that the correct command signal has been received to operate the external air-cooling unit or internal heating unit. (6) A pair of indicator lights signal when the air-cooling unit or the heating unit is operational, and another indicator light signals when the receiver controller has received the command signal from the thermostat controller.

SCOPE OF THE INVENTION

The above presents a description of the best mode we contemplate of carrying out our air conditioning system and its components, and of the manner and process of making and using it, in such full, clear, concise, and exact terms as to enable any person skilled in the art to which it pertains to make and use our air conditioning system and its components. Our) our air conditioning system and its components are, however, susceptible to modifications and alternate constructions from the illustrative embodiments discussed above which are fully equivalent. Consequently, it is not the intention to limit our air conditioning system and its components to the particular embodiments disclosed. On the contrary, our intention is to cover all modifications and alternate constructions coming within the spirit and scope of limit our air conditioning system and its components as generally expressed by the following claims, which particularly point out and distinctly claim the subject matter of our invention:

The invention claimed is:

1. Air conditioning system for a building comprising
an evaporator within the building and a compressor at a remote location exterior to the building that is under the control of a switching device,
said compressor being connected to the evaporator by a line that extends into the building and through which a refrigerant is cycled between the compressor and the evaporator,
a thermostat within the building that responds to temperature changes to provide a temperature control signal, and
a control unit including
a transmitter within the building that is electrically connected to the thermostat and in response to the temperature control signal transmits a control signal to the remote location, and
a receiver at or nearby the compressor that is responsive to the control signal from the transmitter to control the operation of the switching device,
said receiver including a plurality of terminals enabling the receiver to be connected to electrical or mechanical means for operation of the compressor.

2. Air conditioning system for a building comprising
an evaporator within the building and a compressor at a remote location exterior to the building that is under the control of a switching device,
said compressor being connected to the evaporator by a line that extends into the building and through which a refrigerant is cycled between the compressor and the evaporator,
a thermostat within the building that responds to temperature changes to provide a temperature control signal, and
a control unit including
a transmitter within the building that is electrically connected to the thermostat and in response to the temperature control signal transmits a control signal to the remote location, and a receiver at or nearby the compressor that is responsive to the control signal from the transmitter to control the operation of the switching device,
where the receiver includes a plurality of terminals enabling the receiver to be connected to a transformer, an additional switching device for the compressor, or an electro-mechanical device for operating a directional flow control valve for the compressor.

3. The air conditioning system of claim 2 including a transformer that steps down power line voltage to provide a voltage to the receiver lower than power line voltage.

4. Air conditioning system for a building comprising
an evaporator within the building and a compressor at a remote location exterior to the building that is under the control of a switching device,
said compressor being connected to the evaporator by a line that extends into the building and through which a refrigerant is cycled between the compressor and the evaporator,
a thermostat within the building that responds to temperature changes to provide a temperature control signal, and
a control unit including
a transmitter within the building that is electrically connected to the thermostat and in response to the temperature control signal transmits a control signal to the remote location, and a receiver at or nearby the compressor that is responsive to the control signal from the transmitter to control the operation of the switching device,
where the receiver includes
a first terminal connected to one terminal of the transformer,
a second terminal connected to another terminal of the transformer, and
a third terminal and a forth terminal enabling the receiver to be connected to (a) the switching device for the compressor and an additional switching device when the compressor is a two-stage compressor, or (b) an electro-mechanical device for operating a directional flow control valve for the compressor.

5. Air conditioning system for a building comprising
an evaporator within the building and compressor at a remote location exterior to the building that is under the control of a first switching device,
said compressor being connected to the evaporator by a line that extends into the building and through which a refrigerant is cycled between the compressor and the evaporator, said line including an electronically actuated directional flow control valve,
a thermostat within the building that responds to temperature changes to provide a temperature control signal,
a transformer that steps down power line voltage, and
a control unit including a transmitter within the building that is electrically connected to the thermostat and in response to the temperature control signal transmits a control signal to the remote location, and a receiver at or nearby the compressor that is responsive to the control signal from the transmitter to control the operation of the switching device and the directional flow control valve, said receiver including a first pair of terminals connected across the transformer and a second pair of terminals connected across an electronically responsive device that operates the directional flow control valve.

6. The air conditioning system of claim 5 where the transmitter includes multiple terminals corresponding to the number of terminals of the receiver.

7. Air conditioning system for a building comprising a heating and cooling system including a heater, a blower, an evaporator, and a compressor under the control of a first switching device, said heater, blower, and evaporator being installed within the building and said compressor being at a remote location exterior to the building, said compressor being connected to the evaporator by a line that extends into the building and through which a refrigerant is cycled between the compressor and the evaporator, a thermostat within the building that responds to temperature changes to provide a temperature control signal, and a control unit including a transmitter within the building that is electrically connected to the thermostat and in response to the temperature control signal transmits a control signal to the remote location, and a receiver at or nearby the compressor that is responsive to the control signal from the transmitter to control the operation of the first switching device, said receiver including a plurality of terminals enabling the receiver to be connected to electrical or mechanical means for operation of the compressor.

8. The air conditioning system of claim 7 where the compressor has two stages with the first switching device operating the first stage and a second switching device operating the second stage, and the receiver includes a pair of terminals, one terminal adapted to be connected to the first switching device and another terminal adapted to be connected to second switching device.

9. The air conditioning system of claim 8 where the transmitter includes multiple terminals corresponding to the number of terminals of the receiver.

* * * * *